(12) United States Patent
Luik et al.

(10) Patent No.: US 7,966,412 B2
(45) Date of Patent: Jun. 21, 2011

(54) SYSTEM AND METHOD FOR A PLUGGABLE PROTOCOL HANDLER

(75) Inventors: Oliver Luik, Wiesloch (DE); Galin Galchev, Sofia (BG)

(73) Assignee: SAP AG, Walldorf (DE)

( * ) Notice: Subject to any disclaimer, the term of this patent is extended or adjusted under 35 U.S.C. 154(b) by 168 days.

(21) Appl. No.: 11/185,199

(22) Filed: Jul. 19, 2005

(65) Prior Publication Data

US 2007/0067469 A1    Mar. 22, 2007

(51) Int. Cl.
*G06F 15/16* (2006.01)
(52) U.S. Cl. ........................................ 709/230
(58) Field of Classification Search .................. 709/213, 709/230, 250; 370/465; 707/4; 719/311
See application file for complete search history.

(56) References Cited

U.S. PATENT DOCUMENTS

| | | | |
|---|---|---|---|
| 5,331,318 A | 7/1994 | Montgomery | |
| 5,553,242 A | 9/1996 | Russell et al. | |
| 5,566,302 A | 10/1996 | Khalidi et al. | |
| 5,566,315 A | 10/1996 | Milillo et al. | |
| 5,590,328 A * | 12/1996 | Seno et al. | 718/105 |
| 5,617,570 A | 4/1997 | Russell et al. | |
| 5,692,193 A | 11/1997 | Jagannathan et al. | |
| 5,710,909 A | 1/1998 | Brown et al. | |
| 5,745,778 A | 4/1998 | Alfieri | |
| 5,805,790 A | 9/1998 | Nota et al. | |
| 5,809,527 A | 9/1998 | Cooper et al. | |
| 5,926,834 A | 7/1999 | Carlson et al. | |
| 5,944,781 A | 8/1999 | Murry | |
| 5,961,584 A | 10/1999 | Wolf | |
| 5,974,566 A | 10/1999 | Ault et al. | |
| 6,038,571 A | 3/2000 | Numajiri et al. | |
| 6,065,006 A | 5/2000 | deCarmo et al. | |
| 6,075,938 A | 6/2000 | Bugnion et al. | |
| 6,092,171 A | 7/2000 | Relph | |
| 6,115,712 A | 9/2000 | Islam et al. | |
| 6,115,721 A | 9/2000 | Nagy | |
| 6,167,423 A | 12/2000 | Chopra et al. | |
| 6,167,449 A | 12/2000 | Arnold et al. | |
| 6,199,179 B1 | 3/2001 | Kauffman et al. | |
| 6,216,212 B1 | 4/2001 | Challenger et al. | |
| 6,256,712 B1 | 7/2001 | Challenger | |
| 6,272,598 B1 | 8/2001 | Arlitt et al. | |
| 6,292,099 B1 * | 9/2001 | Tse et al. | 340/506 |
| 6,295,582 B1 | 9/2001 | Spencer | |

(Continued)

FOREIGN PATENT DOCUMENTS

EP    0459931    12/1991

(Continued)

OTHER PUBLICATIONS

Barrett, Ryan, P4 Protocol Specification, Sep. 2001, p. 1-12.*

(Continued)

*Primary Examiner* — Kevin Bates
*Assistant Examiner* — Jason Recek
(74) *Attorney, Agent, or Firm* — Schwegman, Lundberg & Woessner, P.A.

(57) ABSTRACT

Embodiments of the invention are generally directed to a system and method for pluggable protocol handlers to route message traffic between communication partners. In an embodiment, a protocol independent connection manager receives a message from a communication partner over a network connection. The connection manager calls a dynamically loadable protocol handler to process and route the received message to a subsequent communication partner. In one embodiment, the network connection is a multiplexed network connection.

31 Claims, 8 Drawing Sheets

U.S. PATENT DOCUMENTS

| | | |
|---|---|---|
| 6,336,170 B1 | 1/2002 | Dean et al. |
| 6,356,529 B1* | 3/2002 | Zarom .................... 370/231 |
| 6,356,946 B1 | 3/2002 | Clegg et al. |
| 6,385,643 B1 | 5/2002 | Jacobs et al. |
| 6,385,653 B1* | 5/2002 | Sitaraman et al. ......... 709/230 |
| 6,412,045 B1 | 6/2002 | DeKoning et al. |
| 6,415,364 B1 | 7/2002 | Bauman et al. |
| 6,425,057 B1 | 7/2002 | Cherkasova et al. |
| 6,438,654 B1 | 8/2002 | Elko et al. |
| 6,446,088 B1 | 9/2002 | Vaduvur et al. |
| 6,502,148 B1 | 12/2002 | Krum |
| 6,519,594 B1 | 2/2003 | Li |
| 6,523,027 B1 | 2/2003 | Underwood |
| 6,539,445 B1 | 3/2003 | Krum |
| 6,587,937 B1 | 7/2003 | Jensen et al. |
| 6,591,347 B2 | 7/2003 | Tischler et al. |
| 6,601,112 B1 | 7/2003 | O'Rourke et al. |
| 6,615,253 B1 | 9/2003 | Bowman-Amuah |
| 6,640,244 B1 | 10/2003 | Bowman-Amuah |
| 6,651,080 B1 | 11/2003 | Liang et al. |
| 6,687,702 B2 | 2/2004 | Vaitheeswaran et al. |
| 6,728,748 B1 | 4/2004 | Mangipudi et al. |
| 6,732,237 B1 | 5/2004 | Jacobs et al. |
| 6,738,977 B1 | 5/2004 | Berry et al. |
| 6,754,662 B1 | 6/2004 | Li |
| 6,757,708 B1 | 6/2004 | Craig et al. |
| 6,760,911 B1 | 7/2004 | Ye |
| 6,766,419 B1 | 7/2004 | Zahir et al. |
| 6,772,409 B1 | 8/2004 | Chawla et al. |
| 6,799,202 B1 | 9/2004 | Hankinson et al. |
| 6,829,679 B2 | 12/2004 | DeSota et al. |
| 6,944,711 B2 | 9/2005 | Mogi et al. |
| 6,970,925 B1 | 11/2005 | Springmeyer et al. |
| 6,976,090 B2 | 12/2005 | Ben-Shaul et al. |
| 6,990,534 B2 | 1/2006 | Mikhailov et al. |
| 6,996,679 B2 | 2/2006 | Cargnoni et al. |
| 7,013,329 B1 | 3/2006 | Paul et al. |
| 7,024,512 B1 | 4/2006 | Franaszek et al. |
| 7,051,161 B2 | 5/2006 | Dixit et al. |
| 7,069,271 B1 | 6/2006 | Fadel et al. |
| 7,089,566 B1 | 8/2006 | Johnson |
| 7,096,319 B2 | 8/2006 | Mogi et al. |
| 7,096,418 B1 | 8/2006 | Singhal et al. |
| 7,111,300 B1 | 9/2006 | Salas et al. |
| 7,127,472 B1 | 10/2006 | Enokida et al. |
| 7,149,741 B2 | 12/2006 | Burkey et al. |
| 7,165,239 B2 | 1/2007 | Hejlsberg et al. |
| 7,174,363 B1 | 2/2007 | Goldstein et al. |
| 7,177,823 B2 | 2/2007 | Lam et al. |
| 7,191,170 B2* | 3/2007 | Ganguly et al. ............ 707/2 |
| 7,296,267 B2 | 11/2007 | Cota-Robles et al. |
| 7,305,495 B2* | 12/2007 | Carter .................... 710/11 |
| 7,532,571 B1* | 5/2009 | Price et al. ............... 370/225 |
| 7,539,821 B2 | 5/2009 | Petev et al. |
| 7,552,284 B2 | 6/2009 | Petey et al. |
| 7,840,760 B2 | 11/2010 | Petey et al. |
| 2001/0029520 A1 | 10/2001 | Miyazaki |
| 2002/0046325 A1 | 4/2002 | Cai et al. |
| 2002/0052914 A1 | 5/2002 | Zalewski et al. |
| 2002/0073283 A1 | 6/2002 | Lewis et al. |
| 2002/0083118 A1 | 6/2002 | Sim |
| 2002/0087700 A1* | 7/2002 | Chae ...................... 709/227 |
| 2002/0093487 A1 | 7/2002 | Rosenberg |
| 2002/0099691 A1 | 7/2002 | Lore et al. |
| 2002/0099753 A1 | 7/2002 | Hardin et al. |
| 2002/0133805 A1 | 9/2002 | Pugh et al. |
| 2002/0147888 A1 | 10/2002 | Trevathan |
| 2002/0156863 A1 | 10/2002 | Peng |
| 2002/0169926 A1 | 11/2002 | Pinckney et al. |
| 2002/0174097 A1 | 11/2002 | Rusch et al. |
| 2002/0181307 A1 | 12/2002 | Fifield et al. |
| 2002/0198923 A1 | 12/2002 | Hayes |
| 2002/0198953 A1 | 12/2002 | O'Rourke et al. |
| 2003/0014552 A1 | 1/2003 | Vaitheeswaran et al. |
| 2003/0023827 A1 | 1/2003 | Palanca et al. |
| 2003/0037148 A1* | 2/2003 | Pedersen .................. 709/227 |
| 2003/0037178 A1 | 2/2003 | Vessey et al. |
| 2003/0065711 A1 | 4/2003 | Acharya et al. |
| 2003/0074580 A1 | 4/2003 | Knouse et al. |
| 2003/0084248 A1 | 5/2003 | Gaither et al. |
| 2003/0084251 A1 | 5/2003 | Gaither et al. |
| 2003/0088604 A1 | 5/2003 | Kuck et al. |
| 2003/0093420 A1 | 5/2003 | Ramme |
| 2003/0093487 A1 | 5/2003 | Czajkowski et al. |
| 2003/0097360 A1 | 5/2003 | McGuire et al. |
| 2003/0105887 A1 | 6/2003 | Cox et al. |
| 2003/0115190 A1 | 6/2003 | Soderstrom et al. |
| 2003/0131010 A1 | 7/2003 | Redpath |
| 2003/0191795 A1 | 10/2003 | Bernardin et al. |
| 2003/0196136 A1 | 10/2003 | Haynes et al. |
| 2003/0200526 A1 | 10/2003 | Arcand |
| 2003/0208563 A1 | 11/2003 | Acree et al. |
| 2003/0229529 A1 | 12/2003 | Mui et al. |
| 2003/0229760 A1 | 12/2003 | Doyle et al. |
| 2003/0236857 A1 | 12/2003 | Takase et al. |
| 2004/0024610 A1 | 2/2004 | Fradkov et al. |
| 2004/0024971 A1 | 2/2004 | Bogin et al. |
| 2004/0045014 A1 | 3/2004 | Radhakrishnan |
| 2004/0054725 A1* | 3/2004 | Moller et al. ............. 709/204 |
| 2004/0054860 A1 | 3/2004 | Dixit et al. |
| 2004/0088412 A1 | 5/2004 | John et al. |
| 2004/0117441 A1 | 6/2004 | Liu et al. |
| 2004/0128370 A1 | 7/2004 | Kortright |
| 2004/0153509 A1 | 8/2004 | Alcorn et al. |
| 2004/0167980 A1 | 8/2004 | Doyle et al. |
| 2004/0168029 A1 | 8/2004 | Civlin |
| 2004/0168031 A1 | 8/2004 | Haskins |
| 2004/0187140 A1 | 9/2004 | Aigner et al. |
| 2004/0205299 A1 | 10/2004 | Bearden |
| 2004/0215883 A1 | 10/2004 | Bamford et al. |
| 2004/0221285 A1 | 11/2004 | Donovan et al. |
| 2004/0221294 A1 | 11/2004 | Kalmuk et al. |
| 2004/0243709 A1 | 12/2004 | Kalyanavarathan et al. |
| 2005/0021917 A1 | 1/2005 | Mathur et al. |
| 2005/0027943 A1 | 2/2005 | Steere et al. |
| 2005/0055686 A1 | 3/2005 | Buban et al. |
| 2005/0071459 A1* | 3/2005 | Costa-Requena et al. .... 709/224 |
| 2005/0086237 A1 | 4/2005 | Monnie et al. |
| 2005/0086656 A1 | 4/2005 | Whitlock et al. |
| 2005/0086662 A1 | 4/2005 | Monnie et al. |
| 2005/0091388 A1* | 4/2005 | Kamboh et al. ............ 709/228 |
| 2005/0125503 A1* | 6/2005 | Iyengar et al. ............ 709/213 |
| 2005/0131962 A1 | 6/2005 | Deshpande |
| 2005/0138193 A1* | 6/2005 | Encarnacion et al. ........ 709/230 |
| 2005/0154837 A1 | 7/2005 | Keohane et al. |
| 2005/0160396 A1 | 7/2005 | Chadzynski |
| 2005/0180429 A1* | 8/2005 | Ghahremani et al. ... 370/395.21 |
| 2005/0188068 A1 | 8/2005 | Kilian |
| 2005/0198199 A1* | 9/2005 | Dowling .................. 709/217 |
| 2005/0216502 A1 | 9/2005 | Kaura et al. |
| 2005/0238047 A1* | 10/2005 | Holland et al. ............. 370/465 |
| 2005/0262181 A1 | 11/2005 | Schmidt et al. |
| 2005/0262493 A1 | 11/2005 | Schmidt et al. |
| 2005/0262512 A1 | 11/2005 | Schmidt et al. |
| 2005/0268294 A1 | 12/2005 | Petev et al. |
| 2006/0036448 A1 | 2/2006 | Haynie et al. |
| 2006/0059453 A1 | 3/2006 | Kuck et al. |
| 2006/0064545 A1 | 3/2006 | Wintergerst |
| 2006/0064549 A1 | 3/2006 | Wintergerst |
| 2006/0069712 A1* | 3/2006 | Anders et al. .............. 709/201 |
| 2006/0070051 A1 | 3/2006 | Kuck et al. |
| 2006/0092165 A1 | 5/2006 | Abdalla et al. |
| 2006/0094351 A1 | 5/2006 | Nowak et al. |
| 2006/0129512 A1 | 6/2006 | Braun et al. |
| 2006/0129546 A1 | 6/2006 | Braun et al. |
| 2006/0129981 A1 | 6/2006 | Dostert et al. |
| 2006/0130063 A1 | 6/2006 | Kilian et al. |
| 2006/0136667 A1 | 6/2006 | Shultz et al. |
| 2006/0143256 A1 | 6/2006 | Galchev et al. |
| 2006/0143328 A1 | 6/2006 | Fleischer et al. |
| 2006/0143389 A1 | 6/2006 | Kilian et al. |
| 2006/0143392 A1 | 6/2006 | Petev et al. |
| 2006/0143393 A1 | 6/2006 | Petev |
| 2006/0143427 A1 | 6/2006 | Marwinski et al. |
| 2006/0143608 A1 | 6/2006 | Dostert et al. |
| 2006/0143609 A1 | 6/2006 | Stanev |
| 2006/0143618 A1 | 6/2006 | Fleischer et al. |

| | | | |
|---|---|---|---|
| 2006/0143619 | A1 | 6/2006 | Galchev et al. |
| 2006/0150197 | A1 | 7/2006 | Werner |
| 2006/0155867 | A1* | 7/2006 | Kilian et al. .................. 709/231 |
| 2006/0159197 | A1 | 7/2006 | Kraut et al. |
| 2006/0167980 | A1 | 7/2006 | Werner |
| 2006/0168646 | A1 | 7/2006 | Werner |
| 2006/0168846 | A1 | 8/2006 | Juan |
| 2006/0193318 | A1* | 8/2006 | Narasimhan et al. ......... 370/389 |
| 2006/0248140 | A1* | 11/2006 | Birenheide ................... 709/203 |
| 2006/0248177 | A1* | 11/2006 | Dostert et al. ................ 709/223 |
| 2006/0248234 | A1* | 11/2006 | Pope et al. .................... 709/250 |
| 2006/0248283 | A1* | 11/2006 | Galchev et al. ............... 711/141 |
| 2006/0253558 | A1 | 11/2006 | Acree et al. |
| 2006/0274064 | A1* | 12/2006 | Dougherty et al. ........... 345/422 |
| 2006/0282509 | A1 | 12/2006 | Kilian et al. |
| 2006/0294253 | A1* | 12/2006 | Linderman ................... 709/230 |
| 2007/0027877 | A1 | 2/2007 | Droshev et al. |
| 2007/0050768 | A1 | 3/2007 | Brown et al. |
| 2007/0055781 | A1 | 3/2007 | Fleischer et al. |
| 2007/0150586 | A1 | 6/2007 | Kilian et al. |
| 2007/0156869 | A1 | 7/2007 | Galchev et al. |
| 2007/0156907 | A1 | 7/2007 | Galchev et al. |
| 2009/0282196 | A1 | 11/2009 | Petev et al. |

FOREIGN PATENT DOCUMENTS

| | | |
|---|---|---|
| EP | 1380941 | 1/2004 |
| EP | 1027796 | 6/2004 |
| WO | WO/0023898 | 4/2000 |
| WO | WO-0142908 | 6/2001 |
| WO | WO-03073204 | 9/2003 |
| WO | WO-2004038586 | 5/2004 |

OTHER PUBLICATIONS

"SAP Web Application Server Security Guide", Apr. 29, 2004, Version 1.00, pp. 79-81, 89.*

"All Classes", http://www.jdocs.com/osche/2.0.2/api/com/opensymphony/oscache/base/allclases-frame.html.

"Caching with IBM WebSphereMQ", *spiritcache, Use Case & Code Example, article*, (Nov. 19, 2004), 1-9.

"Class AbstractCacheAdministrator", http://www.jdocs.com/osche/2.0.2/api/com/opensymphony/oscache/base/AbstractCache.html (Jan. 2004), 1-11.

"Class Cache", http://www.jdocs.com/osche/2.0.2/api/com/opensymphony/oscache/base/Cache.html (Jan. 2004), 1-16.

"Class CacheEntry", http://www.jdocs.com/osche/2.0.2/api/com/opensymphony/oscache/base/CacheEntry.html (Jan. 2004), 1-8.

"Class Config", http://www.jdocs.com/osche/2.0.2/api/com/opensymphony/oscache/base/Config.html (Jan. 2004), 1-4.

"Failover for Clustered RMI-P4 Remote Objects", *SAP Library*, http://help.sap.com/saphelp_nw04/helpdata/en/f6/4ef11ab3a52f408aa8a133f33d6cf1/cont (Nov. 2004), 1-3.

"Failover for Enterprise Beans", *SAP Library*, http://help.sap.com/saphelp_nw04/helpdata/en/8f/d6e45953a494499ea1b79ab16321d2/cont (Nov. 2004), 1-3.

"Failover System", *SAP Library*, Nov. 2004,http://help.sap.com/saphelp_nw04/helpdata/en/d7/57/af0cce55143be5de3a6e4911186.cont, 2.

"High Availability and Failover", *SAP Library*, http://help.sap.com/saphelp_nw04/helpdata/en/6c/209da105668c45be12f1d9cc412e2b/cont (Nov. 2004), 1-2.

"Http Sessions and Failover of Web Application", *SAP Library* http://help.sap.com/saphelp_nw04/helpdata/en/90/044cc585eaba42b649f16181b0fdf/cont. (Nov. 2004), 1.

"Introducing Cache-Forward Architecture", *ObjectStore, paper* (Jan. 1, 2004), 1-23.

"Java Technology in SAP Web Application Server" *SAP Library*, http://help.sap.com/saphelp_nw04/helpdata/en/0d/a3bbeff62847ae10000000a114084/cont (Nov. 2004), 1-3.

"Java VineetB-log.java", http://homepage.mac.com/vineetb/iblog/C684524823/ (Dec. 18, 2003), 1.

"JCS Plugin Overview", http://jakarta.apache.org/jcs/Plugins.html (Jul. 2004), 2.

"JSR 107: JCACHE"—*Java Temporary Caching API*, Website, http://web1.jcp.org/en;jsr/detail?id=107 (Nov. 28, 2004), 4.

"Load Balancing of the SAP Web as for Java Applications" *SAP Library*, http://help.sap.com/saphelp_nw04/helpdata/en/b5/e8239ef7bd494f896a84625d4b688f/cont. (Nov. 2004), 2.

"Managers—Intro", http://db.apache.org/torque-32/managers-cache.html (Apr. 11, 2002), 1-4.

"Open Source Cache Solutions in Java", http://java-source.net/open-source/cache-solutions (Nov. 2004), 1-3.

"OSCache", http://www.opensymphony.com/oscache (Nov. 2004), 1.

"OSCache 2.0.2", http://www.jdocs.com/osche/2.0.2/api/com/opensymphony/oscache/base/overview-frame.html (Jan. 2004), 1.

"OSCache, V 2.0.2 API Specification", http://www.jdocs.com/osche/2.0.2/api/com/opensymphony/oscache/base/overview-sum.html (Jan. 2004), 2.

"SAP Beefs Up Java Support Capabilities for New NetWeaver" (*Computerworld*) http:www.computerworld.com/printthis/2004/0,4814,96558,00.html (Oct. 11, 2004), 1-2.

"SAP NetWever Makes Standard Java Robust" http://www.sap.com/company/press/press/epx?pageview=print&pressid=3069 (Oct. 5, 2004), 1-2.

"SAP Presents New Capabilities for Netweaver" http://www.infoworld.com/article/04/10/06/HNsapnetweaver_1.html (Oct. 6, 2004), 1-5.

"spiritcache", http://www.spirit-soft.com/index.do?id=30 (Nov. 2004), 1.

"System and Method for Shared Memory/File System Java ObjectGroup Clustered JVM" http://priorartdatabase.com/IPCON000021597/ (Jan. 2004), 3.

"turbine-jcs-dev", http://www.mail-archive.com/turbine-jcs-dev@jakarta.apache.org/msg00647.html (Jul. 13, 2004), 1-3.

"Using Rules-based Object Caching: Allocating dataresources for best service levels to profitable customers" *White paper* (Nov. 2004), 1-8.

"WebLogic RMI Features and Guidelines" http://e-docs.bea.com/wls/docs90/rmi/rmi_api.html (Nov. 2004), 1-7.

Bortvedt, Jerry, "Functional Specification for Object Caching Service for Java (OCS4J), 2.0", pp. 1-27.

Bryce, Ciaran, "Isolates: A New Approach to Multi-Programming in Java Platforms" (May 2004), 7.

Conte, Thomas, "Implementing OSCache" http://www.pas.net/tom/articles/oscache/en/ (Jun. 2002), 1-4.

Czajkowski, Grzegorz . et al.. "A Multi-User Virtual Machine" *Paper, Sun Microsystems Laboratories and S3 Lab*, Purdue University, West Lafayette, IN, (2003), 14.

Czajkowski, Grzegorz, "Multitasking without Compromise: A Virtual Machine Evolution" *Paper, Sun Microsystems Laboratories* (2001), 1-14.

Dagfinn, Parnas, "SAP Virtual Machine Container" https://weblogs.sdn.sap.com/pub/wlg/940 (Oct. 23, 2004), 1-4.

Davies, Robert, "Data Caching: A Prerequisite to the Enterprise Service Bus" *Business Integration Journal* (Oct. 2003), 41-44.

Dillenberger, D., et al., "Building a java Virtual Machine for Serve Applications: The Jvm on Os/390" *IBM Systems Journal*, vol. 39, No. 1 (2000), 194-210.

Doyle, Patrick, et al., "A Modular and Extensible JVM Infrastructure" *Paper, Edward S. Rogers Sr. Department of Electrical and Computer Engineering*, University of Toronto, Toronto, Ontario, Canada (Jul. 2002), 14.

Dwarkadas, Sandhya, et al., "Cashmere-VLM: Remote Memory Paging for Software Distributed Shared Memory" *Paper, Compaq Cambridge Research Lab, Cambridge, MA and Department of Computer Science*, University of Rochester, Rochester, NY, (Apr. 1999), 7.

Ferguson, Renee B., "SAP Preps New NetWeaver Capabilities", eWeek.com, http://www.eweek.com/article2/0,1759,1668146,00.asp (Oct. 7, 2004), 1-6.

Gontmakher, Alex, et al., "Characterizations for Java Memory Behavior", *Paper, Computer Science Department, Technion* (1997), 5.

Jordan, Mick, et al., "Extending a J2EE Server with Dynamic and Flexible Resource Management", *Paper, Sun Microsystems, Inc. and School of Computer Science*, University of Waterloo, Waterloo, ON, Canada, (Oct. 2004), 20.

Jordan, Mick, et al., "Scaling J2EE Application Servers with the Multi-Tasking Virtual Machine", Paper, Sun Microsystems, SMLI TR-2004-135, *Paper, Sun Microsystems, SMLI TR-2004-135*, (Jun. 2004), 1-19.

Kuck, Norbert, et al., "SAP VM Container: Using Process Attachable Virtual Machines to Provide Isolation and Scalability for Large Servers", *Article, SAP AG*, Walldorf, Germany (2002), 1-2.

Loosco, Marcelo, et al., "A New Distributed Java Virtual Machine for Cluster Computing", *Notes in Computer Science, Springer-Verlag*, v. 2790, (2003), 1207-1215.

Luck, Greg. "Ehcache 1.0 released", http://www.theserverside.com/news (Oct. 9, 2004), 1-5.

March, Andres, "OSCache: Change Log", http://www.opensymphony.com/oscache/wiki/Change%20Log.html (Jan. 18, 2004), 1-11.

Marinescu, Floyd, "SpiritSoft Announces Availability of SpiritCache 2.0" http://theserverside.com/news/thread.tss?thread_id=18483 (Mar. 21, 2003), 1-5.

Movva, Sudhir, et al., "Transparent Clustered Database Failover Using JAVA", http://www.guest-pipelines.com/newsletter-v5/0604_A.html (Apr. 2004), 11.

No Author Name Supplied in, Source Data, "Shared disk I/O cache", IP.COM Journal, IP.COM Inc., West Henrietta XP013014199 ISSN: 1533-0001 (Jan. 29, 2004), 6.

Penchikala, Srini, "J2EE Object-Caching Frameworks" http://www.javaworld.com/javaworld/jw-05-2004/jw-0531-cache_p.html (May 31, 2004).

Penchikala, Srini, "Object Caching in a Web Portal Application Using JCS", http://www.onjava.com/pub/a/onjava/2003/caching.html (Dec. 23, 2003), 1-18.

Smits, Thomas, "Unbreakable Java—The Java Server that Never Goes Down", *SAP TechED*, San Diego and Munich (Nov. 2004), 1-5.

Stark, "Concurrent Programming in Java", *CS2 Advanced Programming in Java note 9, S2Bh*, (Jan. 3, 2002), 1-5.

Tullman, Patrick, et al., "Janos: A Java-Oriented OS for Active Network Nodes" *Paper, Flux Research Group*, University of Utah (Mar. 2001), 14.

PCT International Search Report for PCT/EP2006/012420. International filing date Dec. 21, 2006.

*White Paper: 'Using Rules-based Object Caching', spiritsoft/spiritcache 4.0 2004*, (2004).

"RMI Clients on SAP NetWeaver", *SAP Platform Ecosystem*, (2005), Whole Document.

"What LDAP?", http://www.gracion.com/server/whatidap.html, (Dec. 7, 2004).

Casavant, T. L., et al., ""A Taxonomy of Scheduling in General-Purpose Distributed Computing Systems"", Casavant, T.L., and Kuhl, J.G., "A Taxonomoy of Scheduling in General-Purpose Distributed Computing Systems," *IEEE* 14(2):141-154, (1988) XP000039761., (1988), 141-154.

Dandamudi, S. P., "Reducing Run Queue Contention in Shared Memory Multiprocessors", Dandamudi, S.P., "Reducing Run Queue Contention in Shared Memory Multiprocessors," *IEEE* pp. 82-89 (1997) XP000657329., (1997), 82-89.

Handy, Jim, "The Cache Memory Book", 1998, *Academic Press Inc. 2nd Edition*, pp. 60, (1998), vii-229.

Hennessy, John, et al., "Computer Organization and Design", 1998, *Morgan Kaufmann Publishers Inc., 2nd Edition*, pp. 575-576.

Jagannathan, "High-Level Abstraction for Efficient Concurrent Systems", "High-Level Abstraction for Efficient Concurrent Systems", *NEC Research Institute, Section 5.2*, (Mar. 1994), 20.

Kaushik, Dutta, et al., "ReDAL: An Efficient and Practical Request Distribution Technique for the Application Layer", *Internet Article Nov. 11, 2005*, Singapore Management University., 1-30.

Keahey, K., "A Brief Tutorial on CORBA", Keahey, K., *A?A Brief Tutorial on Corba,A?* pp. 5, httpwww.cs.indiana.edu~kksiazektuto.html, pp. 5.

Oetiker, Tobias, "SEPP Software Installation and Sharing System", *Proceedings of the Twelfth Systems Administration Conference (LISA '98)*, Boston, Massachusetts, (Dec. 6-11, 1998), pp. 253-260.

Pasin, Marcia, et al., "High-Available Enterprise JavaBeans Using Group Communication System Support", Pasin et al., "*High-Available Enterprise JavaBeans Using Group Communication System Support*", pp. 1-6, XP002285985., 1-6.

Polk, Jennifer, et al., "Oracle Database Net Services Administrator's Guide 10g Release 1 (10.1)", URL: http://download-west.oracle.com/docs/cd/B19306_/network.102/b14212.pdf>; Oct. 2005; retrieved on Apr. 26, 2007., reference No. XP002431369, (Oct. 2005), 1-29.

Rosenberg, David, "Bringing Java to the Enterprise: Oracle on its Java Server Strategy", *IEEE Internet Computing IEEE USA*, vol. 2, No. 2; Database accession No. 5902816, XP002431362; ISSN: 1089-7801, (Mar. 2, 1998), 52-59.

Salo, Timo, et al., "Object Persistence Beyond Serialization", *Increasing Productivity and Reducing Maintenance, Dr. Dobb's Journal*, M7T Publ., vol. 24, No. 5, May 1999, pp. 5, XP000925486. ISSN: 1044-789X.

Salo, Timo, et al., "Persistence in Enterprise JavaBeans Applications", pp. 3, *JOOP*, Jul. 1999, XP-002142904.

Smits, Thomas, "Unbreakable Java—The Java Server that Never Goes Down", Thomas Smits, "Unbreakable Java", *The Java Server that Never Goes Down*, Nov. 2004, pp. 1-5., Source Date: Nov. 2004. FIP Program made me elect a date so I chose day 1 because I couldn't get to the next screen to load art. Carla Vignola Jul. 10, 2007. (Nov. 2004), 1-5.

Srinivasan, V., et al., "Object Persistence in Object-Oriented Applications", *IBM Systems Journal, IBM Corp.*, vol. 36, No. 1, 1997, pp. 11, XP000685709, ISSN: 0018-8670.

Stark, Ian, "CS2 Advanced Programming in Java Note 9", 2002, pp. 1-5.

Tanenbaum, A. S., "Multimedia Operating Systems", Tanenbaum, A.S., *Modern Operating Systems, 2nd Edition*, Upper Saddle River, New Jersey: Prentice-Hall, Inc., pp. 531-578 (2001). English Translation of: Moderne Betriebssysteme, vol. 2, pp. 539-617, (2002) XP002385695., (2002), 539-617.

Tuttle, Steven, et al., "Understanding LDAP Design and Implemenation", IBM.com Redbooks, (Jun. 2004), 1-774.

Vandermeer, et al., "ReDAL: Request Distribution for the Application Layer", *Distributed Computing Systems*, 2005. Jun. 6, 2005, pp. 717-726.

Werner, Randolf, "Connection of Clients for Management of Systems", U.S. Appl. No. 11/026,604, filed Dec. 30, 2004.

Werner, Randolf, "Interface for External System Management", U.S. Appl. No. 11/027,812, filed Dec. 29, 2004.

Werner, Randolf, "Security for External System Management", U.S. Appl. No. 11/026,323, filed Dec. 29, 2004.

Wolf, Martin, "Administration of the SAP Web Application", *Seminar System Modeling 2005 Hasso-Plattner-Institute for Software Systems Engineering*, (2005), Whole Document.

Yue, K. K., et al., "An Effective Processor Allocation Strategy for Multiprogrammed Shared-Memory Multiprocessors", Yue, K.K. and Lilja, D.J., "An Effective Processor Allocation Strategy for Multiprogrammed Shared-Memory Multiprocessors," *IEEE* 8(12):1246-1258, (1997).

"OA Mailed Mar. 31, 2008 for U.S. Appl. No. 11/025,378", Whole Document.

Barker, et al., ""A load balancing framework for adaptive and asynchronous applications"", *Parallel and Distributed Systems, IEEE Transactions* on vol. 15, Issue 2, (Feb. 2004), pp. 183-192.

Galchev, Galin, et al., "Plug-In Based Cacching Architecture Capable of Implementing Multiple Cache Regions Per Applications", U.S. Appl. No. 11/024,554, filed Dec. 28, 2004—Final Office Action mailed Oct. 29, 2007 with claims as they currently stand., pp. 1-7 and pp. 1-6.

N/A, "Hierarchy for Package Oracle.ias.ciache", http://download-west.oracle.com/docs/cd/B15904_01/web.1012/b14018/oracle/ias/cache/p..., (Nov. 2004), 26.

N/A, "JCS Plugin Overview", http://jakarta.apache.org/jcs/Plugins.html, (Jul. 2004), 2.

Pawlan, Monica, "Reference Objects and Garbage Collection", *Sun Microsystems.*, (Aug. 1998), 8, 15 and 16.

Penchikala, Srini, "Object Caching in a Web Portal Application Using JCS", http://www.onjava.com/pub/a/onjava/2003/12/23/caching.html, (Dec. 23, 2003), 18.

Petev, Petio G., et al, "First in First Out Eviction Implementation", U.S. Appl. No. 11/024,548, filed Dec. 28, 2004—Final Office Action mailed Oct. 3, 2007 with claims as they currently stand., pp. 1-13 and pp. 1-8.
Petev, Petio G., et al., "First in First Out Eviction Implementation" U.S. Appl. No. 11/024,546, filed Dec. 28, 2004, The Office Action mailed Apr. 6, 2007, claims as they stood in the application prior to the mailing of the Office Action an cl, (Dec. 28, 2004), Whole Document.
Petev, Petio G., et al., "Least Frequently Used Eviction Implementation", U.S. Appl. No. 11/024,565, filed Dec. 28, 2004, Non-Final Office Action mailed Oct. 25, 2007 with claims as they currently stand., pp. 1-14 and pp. 9-15.
Petev, Petio G., et al., "Least Recently Used Eviction Implementation", U.S. Appl. No. 11/024,524, filed Dec. 28, 2004—Non-Final Office Action Mailed Oct. 22, 2007 with Claims as they currently stand., pp. 1-12 and pp. 1-7.
Petev, Petio G., et al., "Programming Models for Storage Plugins", U.S. Appl. No. 11/024,651, filed Dec. 28, 2004—Final Office Action mailed Oct. 9, 2007 with claims as they currently stand, pp. 1-8 and pp. 2-8.
Petev, Petio G., et al., "Size Based Eviction Implementation", U.S. Appl. No. 11/024,591, filed Dec. 28, 2004 the Office Action mailed Apr. 13, 2007, claims as they stood in the application prior to the mailing of the Office Action and claims pr, (Dec. 28, 2004), Whole Document.
Petev, Petio G., et al., "Sized Based Eviction Implementation", U.S. Appl. No. 11/024,591, filed Dec. 28, 2004—Final Office Action mailed Oct. 10, 2007 with claims as they currently stand., pp. 1-13 and pp. 1-8.
Surdeanu, et al., ""Design and performance analysis of a distributed Java Virtual Machine"", *Parallel and Distributed Systems, IEEE Transactions* on vol. 13, Issue 6, (Jun. 2002), pp. 611-627.
Wintergerst, Michael, et al., "Programming Models for Eviction Policies", U.S. Appl. No. 11/025,178, filed Dec. 28, 2004, the Office Action mailed Feb. 1, 2007, claims as they stood in the application prior to the mailing of the Office Action, (Dec. 28, 2004), Whole Document.
Wintergerst, Michael, et al., "Programming Models for Eviction Policies", U.S. Appl. No. 11/025,178, filed Dec. 28, 2004—Final Office Action mailed Feb. 20, 2008 with claims as they currently stand., pp. 1-8 and pp. 1-8.
Bresch, Stefan, "Object-relational mapping system and method for generic relationships", U.S. Appl. No. 10/864,185, filed Jun. 8, 2004—Final Office Action mailed Mar. 17, 2008.
European Search Report, "Common Cache Management in a Plurality of Virtual Machines", European Patent Application No. 05028446.2-2201, European Search Report dated Dec. 4, 2007, mailed Dec. 20, 2007, 7 pgs.
Galchev, Galin, "Plug-In Based Caching Architecture Capable of Implementing Multiple Cache Regions Per Application", U.S. Appl. No. 11/024,554, filed Dec. 28, 2004—Non-Final Office Action mailed May 28, 2008, 7 pgs.
Kilian, Frank, et al., "Common Cache Management in a Plurality of Virtual Machines", U.S. Appl. No. 11/025,482, filed Dec. 28, 2004—Non-Final Office Action mailed Apr. 17, 2008, 15 pgs.
Kilian, Frank, et al., "Common Cache Management in a Plurality of Virtual Machines", U.S. Appl. No. 11/025,482, filed Dec. 28, 2004—Non-Final Office Action mailed Feb. 27, 2007, 15 pgs.
Kilian, Frank, et al., "Common Cache Management in a Plurality of Virtual Machines", U.S. Appl. No. 11/025,482, filed Dec. 28, 2004—Final Office Action mailed Jul. 10, 2007, 17 pgs.
Nikolov, Nikolai, "Execution of modified byte code for debugging, testing and/or monitoring of object oriented software", U.S. Appl. No. 10/749,617, filed Dec. 30, 2003—Non-Final Office ction mailed Apr. 9, 2008.
Oracle, *Oracle Application Server 10g Release 2* (10.1.2), Nov. 2004.
Petev, Petio G., "Central Cache Configuration", U.S. Appl. No. 11/117,876, filed Apr. 29, 2005—Non-Final Office Action mailed Oct. 30, 2007, 18 pgs.
Petev, Petio G., "First in First Out Eviction Implementation", U.S. Appl. No. 11/024,546, filed Dec. 28, 2004—Non-Final Office Action mailed Mar. 17, 2008, 18 pgs.

Petev, Petio, et al., "Least frequently used eviction implementation", U.S. Appl. No. 11/024,565, filed Dec. 28, 2004—Non-Final Office Action mailed Jun. 19, 2008, 20.
Petev, Petio G., "Programming Models for Storage Plug-Ins", U.S. Appl. No. 11/024,651, filed Dec. 28, 2004—Non-Final Office Action mailed Mar. 14, 2008, 11 pgs.
Petev, Petio G., "Size Based Eviction Implementation", U.S. Appl. No. 11/024,591, filed Dec. 28, 2004—Non-Final Office Action dated Mar. 11, 2008, 15 pgs.
Wintergerst, Michael, "Cache Eviction" U.S. Appl. No. 10/949,541, filed Sep. 23, 2004—Non-Final Office Action mailed May 30, 2008, 19 pgs.
Notice of Allowance mailed Jul. 28, 2008 for U.S. Appl. No. 11/024,651.
Office Action mailed May 28, 2008 for U.S. Appl. No. 11/024,554.
Notice of Allowance mailed Jun. 9, 2008 for U.S. Appl. No. 11/025,178.
Notice of Allowance mailed Aug. 21, 2008 for U.S. Appl. No. 11/024,591.
Office Action mailed Mar. 17, 2008 for U.S. Appl. No. 11/024,546.
Office Action mailed Mar. 11, 2008 for U.S. Appl. No. 11/024,591, pp. 15, 15.
Office Action mailed Mar. 17, 2008 for U.S. Appl. No. 11/024,565, pp. 18, 18.
Office Action mailed Jun. 19, 2008 for U.S. Appl. No. 11/024565, pp. 22, 22.
Non-Final Office Action mailed Oct. 6, 2008 for U.S. Appl. No. 11/119,08.
USPTO, "OA Mailed Oct. 29, 2008 for U.S. Appl. No. 11/025,482", Whole Document.
USPTO, "FOA Mailed Aug. 14, 2008 for U.S. Appl. No. 11/025,378", Whole Document.
Wang, Ben, "Enter the JBoss Matrix", *JBossCache 1.0 Released* [online] [retrieved on Oct. 24, 2008] Retrieved from the Internet<URL:http://blogs.iboss.com/blog/nfleury/2004/03/25/JBossCache+1.0+Released.html>, (Mar. 25, 2004).
Non-Final Office Action for U.S. Appl. No. 11/118,019 Mailed Nov. 13, 2008, 10 pages.
Non-Final Office Action for U.S. Appl. No. 11/024,524 Mailed Nov. 12, 2008, 31 pages.
Final Office Action for U.S. Appl. No. 11/024,554 Mailed Nov. 26, 2008, 15 pages.
Tanenbaum, Andrew S., "Structured Computer Organization", Prentice-Hall, Inc., 2nd Edition, (1984), 10-12.
"U.S. Appl. No. 11/024,524, Non Final Office Action mailed Oct. 22, 2007", 13 pgs.
"U.S. Appl. No. 11/024,546, Final Office Action mailed Oct. 3, 2007", 14 pgs.
"U.S. Appl. No. 11/024,546, Non Final Office Action mailed Mar. 17, 2008", 15 pgs.
"U.S. Appl. No. 11/024,546, Non Final Office Action mailed Apr. 6, 2007", 19 pgs.
"U.S. Appl. No. 11/024,546, Notice of Allowance mailed Mar. 16, 2009", 4 pgs.
"U.S. Appl. No. 11/024,546, Notice of Allowance mailed Nov. 4, 2008", 10 pgs.
"U.S. Appl. No. 11/024,546, Response filed Jan. 3, 2008 to Final Office Action mailed Oct. 3, 2007", 19 pgs.
"U.S. Appl. No. 11/024,546, Response filed Jul. 6, 2007 to Non Final Office Action mailed Apr. 6, 2007", 15 pgs.
"U.S. Appl. No. 11/024,546, Response filed Sep. 16, 2008 to Non Final Office Action mailed Mar. 17, 2008", 20 pgs.
"U.S. Appl. No. 11/024,554, Final Office Action mailed Oct. 29, 2007", 8 pgs.
"U.S. Appl. No. 11/024,565, Final Office Action mailed Jun. 12, 2007", 18 pgs.
"U.S. Appl. No. 11/024,565, Non Final Office Action mailed Jun. 19, 2008", 20 pgs.
"U.S. Appl. No. 11/024,565, Non Final Office Action mailed Oct. 25, 2007", 15 pgs.
"U.S. Appl. No. 11/024,565, Non Final Office Action mailed Dec. 18, 2006", 18 pgs.

"U.S. Appl. No. 11/024,565, Notice of Allowance mailed Feb. 20, 2009", 8 pgs.

"U.S. Appl. No. 11/024,565, Response filed Jan. 25, 2008 to Non Final Office Action mailed Oct. 25, 2007", 17 pgs.

"U.S. Appl. No. 11/024,565, Response filed Mar. 19, 2007 to Non Final Office Action mailed Dec. 18, 2006", 13 pgs.

"U.S. Appl. No. 11/024,565, Response filed Jul. 26, 2007 to Final Office Action mailed Jun. 12, 2007", 14 pgs.

"U.S. Appl. No. 11/024,565, Response filed Sep. 19, 2008 to Non Final Office Action mailed Jun. 19, 2008", 10 pgs.

"U.S. Appl. No. 11/024,591, Notice of Allowance mailed Aug. 21, 2008", 6 pgs.

"U.S. Appl. No. 11/024,613, Notice of Allowance mailed Dec. 31, 2007", 2 pgs.

"U.S. Appl. No. 11/024,614, Non Final Office Action mailed Aug. 27, 2007", 9 pgs.

"U.S. Appl. No. 11/024,651, Final Office Action mailed Oct. 9, 2007", 9 pgs.

"U.S. Appl. No. 11/024,651, Notice of Allowance mailed Jul. 28, 2008", 7 pgs.

"U.S. Appl. No. 11/025,178, Notice of Allowance mailed Aug. 10, 2007", 7 pgs.

"U.S. Appl. No. 11/117,876, Final Office Action mailed Jan. 27, 2009", 8 pgs.

"U.S. Appl. No. 11/119,084, Non Final Office Action mailed Oct. 6, 2008", 9 pgs.

"U.S. Appl. No. 12/472,256, Preliminary Amendment filed May 26, 2009", 3 pgs.

Tullmann, Patrick, et al., "Janos: A Java-Oriented OS for Active Network Nodes", *Paper, Flux Research Group*, University of Utah, (Mar. 2001), 14 pgs.

Veldema, et al., "Runtime Optimizations for a Java DSM Implementation", *Proceedings of the 2001 Joint ACM-ISCOPE conference on Java Grande*, [online] [retrieved on Jun. 28, 2007] Retrieved from the Internet <URL:http://delivery.acm.org/10.1145/380000/376842/p153-veldema.pdf?key1=376842&key2=2893403811&coll=GUIDE&dl=GUIDE&CFID=26913973&CFTOKEN=12550.

"U.S. Appl. No. 12/472,256 Notice of Allowance mailed Oct. 4, 2010", 8 pgs.

"U.S. Appl. No. 12/472,256, Non-Final Office Action mailed Jul. 9, 2010", 19 pgs.

"U.S. Appl. No. 12/472,256, Response filed Aug. 20, 2010 to Non Final Office Action mailed Jul. 9, 2010", 14 pgs.

* cited by examiner

SYSTEM AND METHOD FOR A PLUGGABLE PROTOCOL HANDLER

FIELD OF INVENTION

The field of invention pertains generally to the software arts; and, more specifically to a system and method for a pluggable protocol handler.

BACKGROUND

Even though standards-based application software (e.g., Java™ based application software) has the potential to offer true competition at the software supplier level, legacy proprietary software has proven reliability, functionality and integration into customer information systems (IS) infrastructures. Customers are therefore placing operational dependency on standards-based software technologies with caution. Not surprisingly, present day application software servers tend to include instances of both standard and proprietary software suites, and, often, "problems" emerge in the operation of the newer standards-based software, or interoperation and integration of the same with legacy software applications.

The prior art application server 100 depicted in FIG. 1 provides a good example. FIG. 1 shows a prior art application server 100 having both an Advanced Business Application Programming™ (ABAP) legacy/proprietary software suite 103 and a Java 2 Enterprise Edition™ (J2EE) standards-based software suite 104. A connection manager 102 routes requests (e.g., HyperText Transfer Protocol (HTTP) requests and HTTP with secure socket layer (HTTPS) requests) associated with "sessions" between server 100 and numerous clients (not shown in FIG. 1) conducted over a network 101. A "session" can be viewed as the back and forth communication over a network 101 between computing systems (e.g., a particular client and the server).

The back and forth communication typically involves a client ("client") sending a server 100 ("server") a "request" that the server 100 interprets into some action to be performed by the server 100. The server 100 then performs the action and if appropriate returns a "response" to the client (e.g., a result of the action). Often, a session will involve multiple, perhaps many, requests and responses. A single session through its multiple requests may invoke different application software programs.

For each client request that is received by the application server's connection manager 102, the connection manager 102 decides to which software suite 103, 104 the request is to be forwarded. If the request is to be forwarded to the proprietary software suite 103, notification of the request is sent to a proprietary dispatcher 105, and, the request itself is forwarded into a request/response shared memory 106. The proprietary dispatcher 105 acts as a load balancer that decides which one of multiple proprietary worker nodes $107_1$ through $107_L$ are to actually handle the request.

A worker node is a focal point for the performance of work. In the context of an application server that responds to client-server session requests, a worker node is a focal point for executing application software and/or issuing application software code for downloading to the client. The term "working process" generally means an operating system (OS) process that is used for the performance of work and is also understood to be a type of worker node. For convenience, the term "worker node" is used throughout the present discussion.

When the dispatcher 105 identifies a particular proprietary worker node for handling the aforementioned request, the request is transferred from the request/response shared memory 106 to the identified worker node. The identified worker node processes the request and writes the response to the request into the request/response shared memory 106. The response is then transferred from the request/response shared memory 106 to the connection manager 102. The connection manager 102 sends the response to the client via network 101.

Note that the request/response shared memory 106 is a memory resource that each of worker nodes $107_1$ through $107_L$ has access to (as such, it is a "shared" memory resource). For any request written into the request/response shared memory 106 by the connection manager 102, the same request can be retrieved by any of worker nodes $107_1$ through $107_L$. Likewise, any of worker nodes $107_1$ through $107_L$ can write a response into the request/response shared memory 106 that can later be retrieved by the connection manager 102. Thus the request/response shared memory 106 provides for the efficient transfer of request/response data between the connection manager 102 and the multiple proprietary worker nodes $107_1$ through $107_L$.

If the request is to be forwarded to the standards-based software suite 104, notification of the request is sent to the dispatcher 108 that is associated with the standards-based software suite 104. As observed in FIG. 1, the standards-based software suite 104 is a Java based software suite (in particular, a J2EE suite) that includes multiple worker nodes $109_1$ through $109_N$.

A Java Virtual Machine is associated with each worker node for executing the worker node's abstract application software code. For each request, dispatcher 108 decides which one of the N worker nodes is best able to handle the request (e.g., through a load balancing algorithm). Because no shared memory structure exists within the standards-based software suite 104 for transferring client session information between the connection manager 102 and the worker nodes $109_1$ through $109_N$, separate internal connections have to be established to send both notification of the request and the request itself to the dispatcher 108 from connection manager 102 for each worker node. The dispatcher 108 then forwards each request to its proper worker node.

Various problems exist with respect to the prior art application server 100 of FIG. 1. For example, the establishment of connections between the connection manager and the J2EE dispatcher to process a client session adds overhead/inefficiency within the standards-based software suite 104. For example, establishing connections between the connection manager and the J2EE dispatcher typically include copying data to and from the network stack. In addition, the J2EE dispatcher opens a separate select thread for each connection. Opening a number of separate threads can add overhead to the system because each thread uses resources such as memory. This increased overhead reduces the efficiency and scalability of application server 100.

SUMMARY

Embodiments of the invention are generally directed to a system and method for pluggable protocol handlers to route message traffic between communication partners. In an embodiment, a protocol independent connection manager receives a message from a communication partner over a network connection. In another embodiment messages are received from a communication partner via a connection oriented shared memory region. The connection manager calls a dynamically loadable protocol handler to process and route the received message to a subsequent communication partner. In one embodiment, the network connection is a multiplexed network connection.

FIGURES

The present invention is illustrated by way of example and not limitation in the figures of the accompanying drawings, in which like references indicate similar elements and in which.

DETAILED DESCRIPTION

Overview

Figure 2:
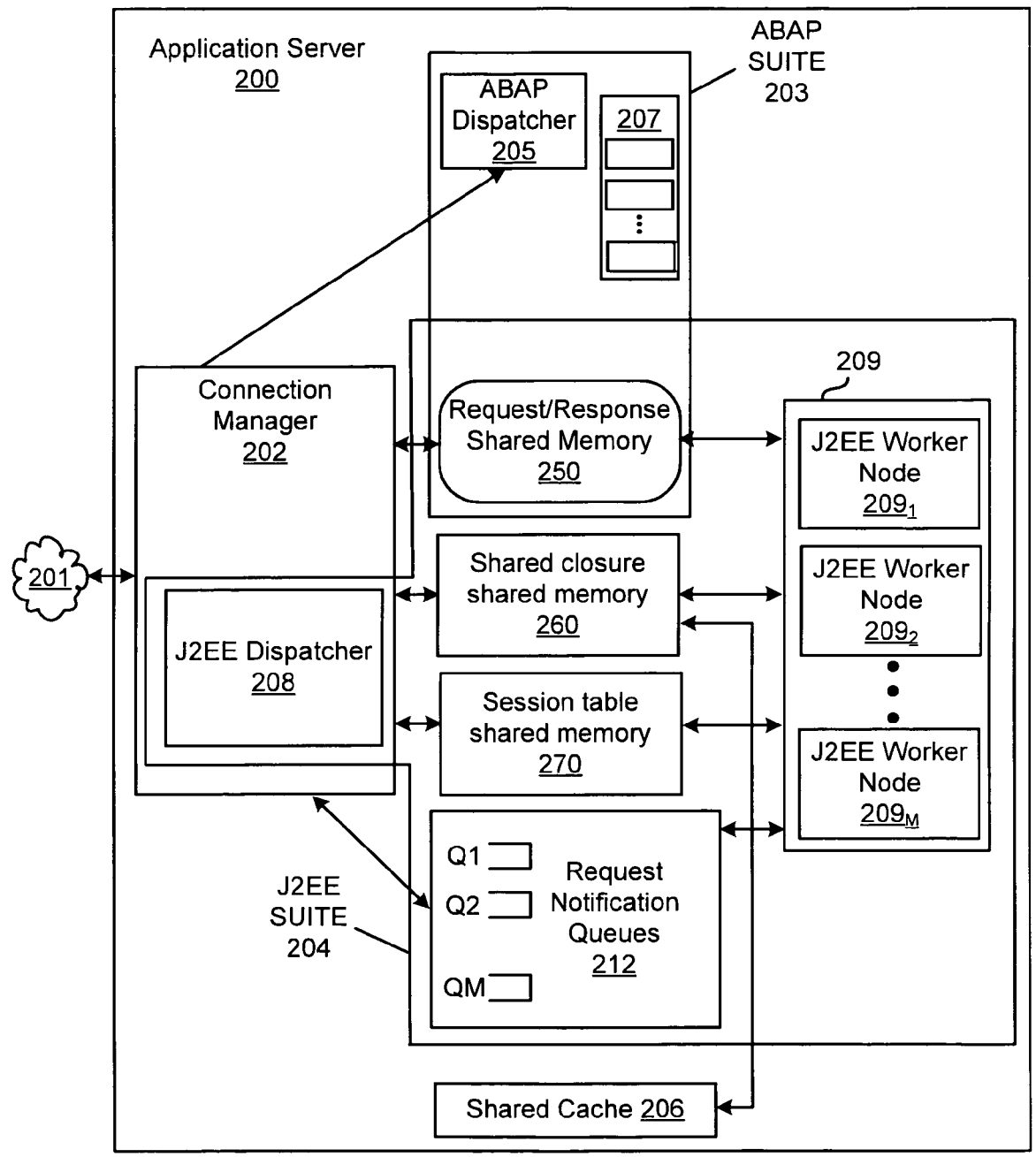
FIG. 2 shows an improved application server.

FIG. 2 shows the architecture of an improved application server in accordance with embodiments of the invention.

Figure 1:
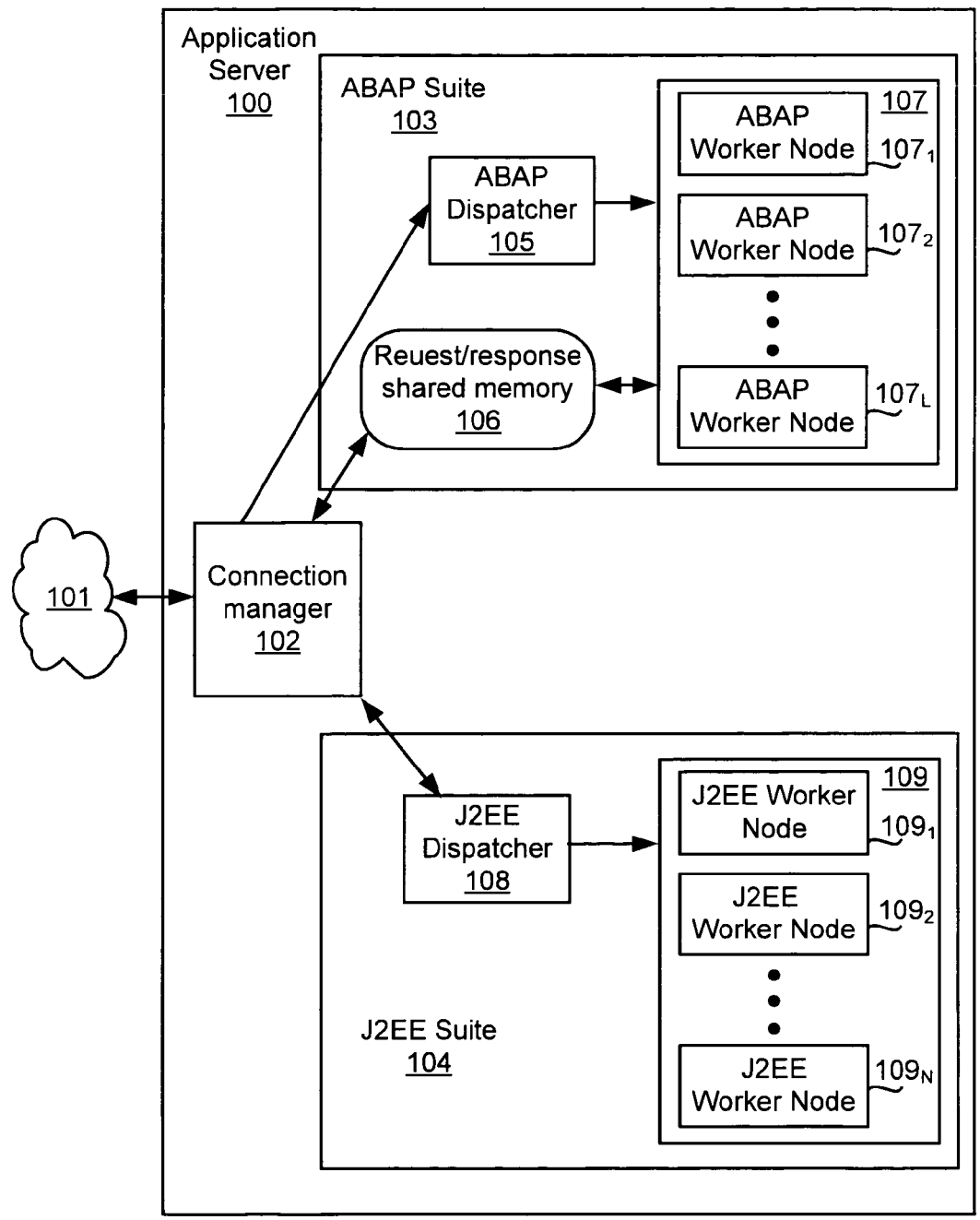
FIG. 1 shows a prior art application server.

Comparing FIGS. 1 and 2, first, note that the role of the connection manager 202 has been enhanced to at least perform dispatching 208 for the standards-based software suite 204 (so as to remove the additional connection overhead associated with the prior art system's standards-based software suite dispatching procedures).

Also, the connection manager is protocol independent. A protocol handler can be plugged into the connection manager to support any one of a number of protocols by which a request can be conveyed to the connection manager. For example, handlers for protocols such as the hypertext transfer protocol (HTTP), secure HTTP (HTTPS), the simple mail transfer protocol (SMTP), the network news transfer protocol (NNTP), the TELNET protocol, the P4 protocol of SAP AG, and the Internet Inter-Object Request Broker Protocol (IIOP) may be provided at the connection manager so that it can receive a request conveyed from a client in accordance with any of these protocols. The advantages of pluggable protocol handlers include: easy extendibility of connection managers with additional protocols; and small and independent software components that can be developed, tested, maintained, and replaced independently, e.g., in the case of an error in one protocol handler, only this part needs to be replaced, not the complete program.

In addition, in one embodiment, the role of a shared memory has been expanded to at least include: a) a first shared memory region 250 that supports request/response data transfers not only for the proprietary suite 203 but also the standards-based software suite 204; b) a second shared memory region 260 that stores session objects having "low level" session state information (e.g., information that pertains to a request's substantive response such as the identity of a specific servlet invoked through a particular web page); and, c) a third shared memory region 270 that stores "high level" session state information (e.g., information that pertains to the flow management of a request/response pair within the application server (e.g., the number of outstanding active requests for a session)).

Regarding request notification queues 212 Q1 through QM, one queue for each of the worker nodes $209_1$ through $209_M$ has been implemented within the standards-based software suite 204. In an embodiment, the shared memory structures 250, 260, 270 and request notification queues 212 help implement a fast session fail over protection mechanism in which a session that is assigned to a first worker node can be readily transferred to a second worker node upon the failure of the first worker node.

Shared memory is memory whose stored content can be reached by multiple worker nodes. Here, the contents of the shared memory region 250 can be reached by each of worker nodes in 207 and 209. Additionally, the contents of shared memory regions 260 and 270 can be reached by each of worker nodes $209_1$ through $209_M$. In one embodiment, shared memory region 260 supports shared cache 206 that can be reached by each of worker nodes $209_1$ through $209_M$.

Different types of shared memory technologies may be utilized within the application server 200 and yet still be deemed as being a shared memory structure. For example, shared memory region 250 may be implemented within a "connection" oriented shared memory technology while shared memory region 260 may be implemented with a "shared closure" oriented shared memory technology.

The connection oriented request/response shared memory region 250 effectively implements a transport mechanism for request/response data between the connection manager and the worker nodes. That is, because the connection manager is communicatively coupled to the shared memory, and because the shared memory is accessible to each worker node, the request/response shared memory 250—at perhaps its broadest level of abstraction—is a mechanism for transporting request/response data between the connection manager and the applicable worker node(s) for normal operation of sessions (e.g., no worker node failure) as well as those sessions affected by a worker node crash.

Although the enhancements of the application server 200 of FIG. 2 have been directed to improving the reliability of a combined ABAP/J2EE application server, it is believed that architectural features and methodologies described in more detail further below can be more generally applied to various forms of computing systems that manage communicative sessions, whether or not such computing systems contain different types of application software suites, and whether any such application software suites are standards-based or proprietary. Moreover, it is believed that such architectural features and methodologies are generally applicable regardless of any particular type of shared memory technology employed.

In operation, the connection manager 202 forwards actual request data to the first shared memory region 250 (request/response shared memory 250) regardless of whether the request is to be processed by one of the proprietary worker nodes 207 or one of the standards-based worker nodes 209. Likewise, the connection manager 202 receives response data for a request from the request/response shared memory 250 whether a proprietary worker node or a standards-based worker node generates the response.

With the exception of having to share the request/response shared memory 250 with the worker nodes 209 of the standards-based software suite 204, the operation of the proprietary software suite 203 is essentially the same as that described in the background, in one embodiment of the invention. That is, the connection manager 202 forwards request notifications to the proprietary dispatcher 205 and forwards the actual requests to the request/response shared memory 250. The proprietary dispatcher 205 then identifies which one of the proprietary worker nodes 207 is to handle the request. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

In an alternative embodiment, the ABAP dispatcher 205 is integrated into the connection manager, just as the J2EE dispatcher 208. Indeed, it is contemplated that a single dispatcher may encompass the functionality of both dispatchers 205 and 208. In the case where the dispatcher 205 is integrated into the connection manager 202, the connection manager identifies which one of the proprietary worker nodes 207 is to handle a request and via its integrated dispatcher capabilities, forwards the request to the request/response shared memory 250. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

Pluggable Protocol Handlers

Figure 3:
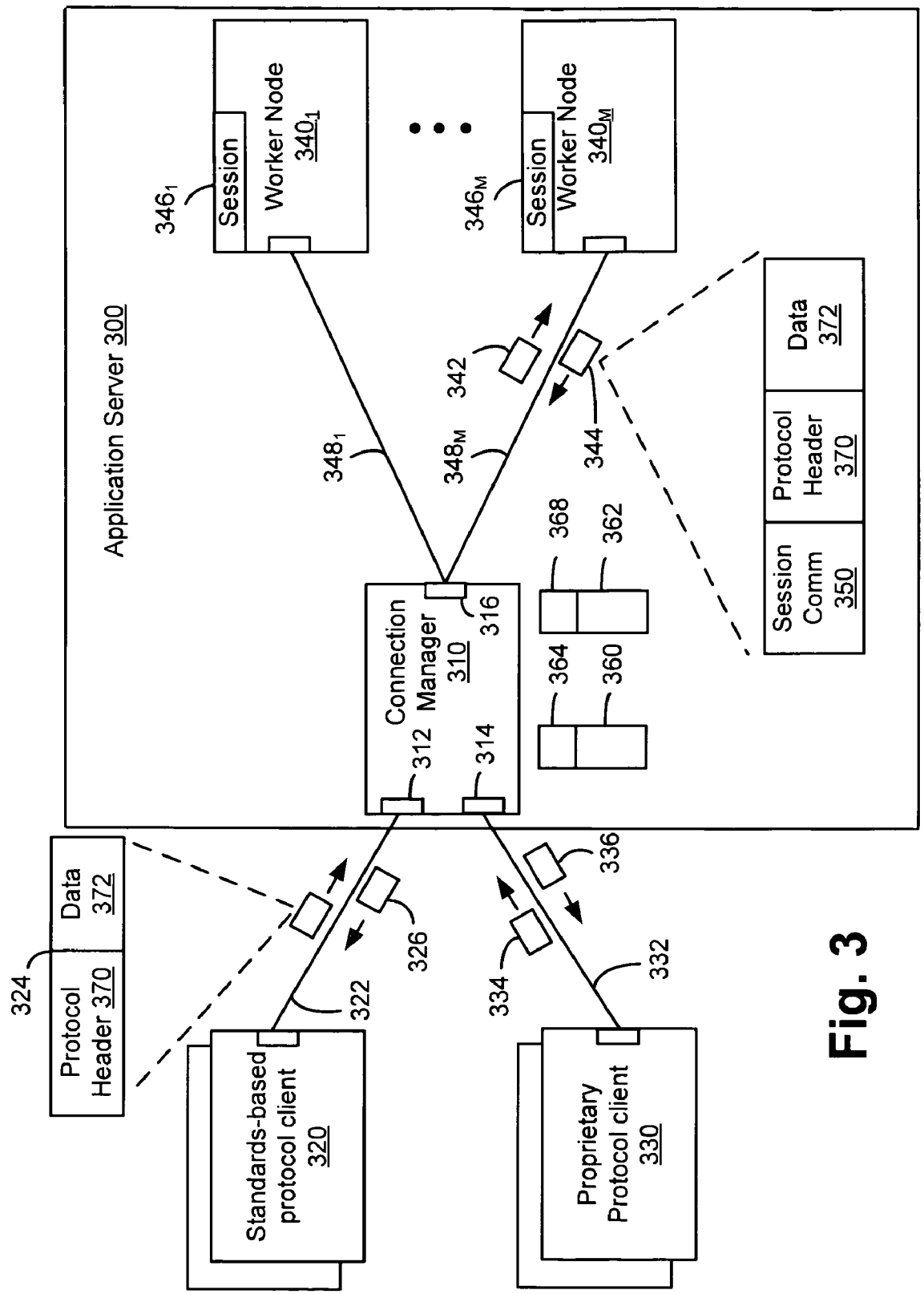
FIG. 3 is a high-level block diagram of an application server illustrating the use of pluggable protocol handlers according to an embodiment of the invention.

FIG. 3 is a high-level block diagram of application server 300 illustrating the use of pluggable protocol handlers according to an embodiment of the invention. Application server 300 includes connection manager 310 and worker nodes $340_1$-$340_M$. Connection manager 310 exchanges messages (e.g., messages 324-326) with standards-based protocol client 320 and proprietary protocol client 330 over network connections 322 and 332 respectively.

In one embodiment, network connections 322 and 332 are multiplexed network connections. A "multiplexed network connection" refers to a network connection in which the messages from more than one client are multiplexed over the same network connection. Since the connections are multiplexed, there is no need to set-up separate network connections for each client, in an embodiment of the invention. This reduces the network connection overhead for connection manager 310.

Connection manager 310 receives messages (e.g., 324 and 334) from one or more clients (clients 320 and 330) on a network connection endpoint (e.g., network connection endpoints 312 and 314). Network connection endpoints 312-314 (and also 316) are identifiable endpoints for a network connection such as the combination of a network layer address (e.g., an Internet Protocol address) and port number.

In one embodiment, connection manager 310 is protocol independent. In such an embodiment, connection manager 310 accesses one or more dynamically pluggable protocol handlers 360-362 through, for example, an Application Programming Interface (API) (e.g., APIs 364-368) to process the received messages. The term "dynamically" refers to pluggable protocol handlers that can be loaded (and removed) at runtime.

Pluggable protocol handlers 360-362 process the received messages 324 and 334 in accordance with the appropriate protocol to determine an appropriate communication partner. Determining an appropriate communication partner for a received message typically includes selecting one of worker nodes $340_1$ through $340_M$ to process the message. Selecting the appropriate worker node can be based on a number of factors including session management information and/or load distribution schemes. The pluggable protocol handler forwards the received message (e.g., message 342) to the selected worker node via, for example, network connections $348_1$-$348_M$ or connection oriented shared memory.

After processing the message 342, the worker node may provide a response message 344. Connection manager 310 receives message 344 on network connection endpoint 316. If a session communication protocol is being used within the server, then connection manager 310 first processes the session information and then calls an appropriate pluggable communication protocol handler 360-362. The pluggable communication protocol handler 360-362 selects the appropriate client (e.g., standards-based protocol client 320 or propriety protocol client 330) and forwards the message to the selected client.

As shown in FIG. 3, connection manager 310 calls pluggable protocol handlers 360-362 to process messages from communication partners that are both external to application server 300 (e.g., clients 320-330) and internal to application server 300 (e.g., worker nodes $340_1$-$340_M$). For ease of reference, the term "internal communication partners" refers to entities that are within the same application server (or cluster) as connection manager 310. Similarly, the term "external communication partners" refers to entities that are external to the application server in which connection manger 310 resides.

The messages sent by (and to) external communication partners (e.g., clients 320-330) are formatted according to either a standards-based protocol or a proprietary protocol. These messages typically have a protocol header and message data. For example, message 324 includes protocol header 370 and data 372. In an embodiment, pluggable communication protocol handlers 360-362 determine an appropriate communication partner for a message based, at least in part, on the protocol header (e.g., protocol header 370).

Figure 4:
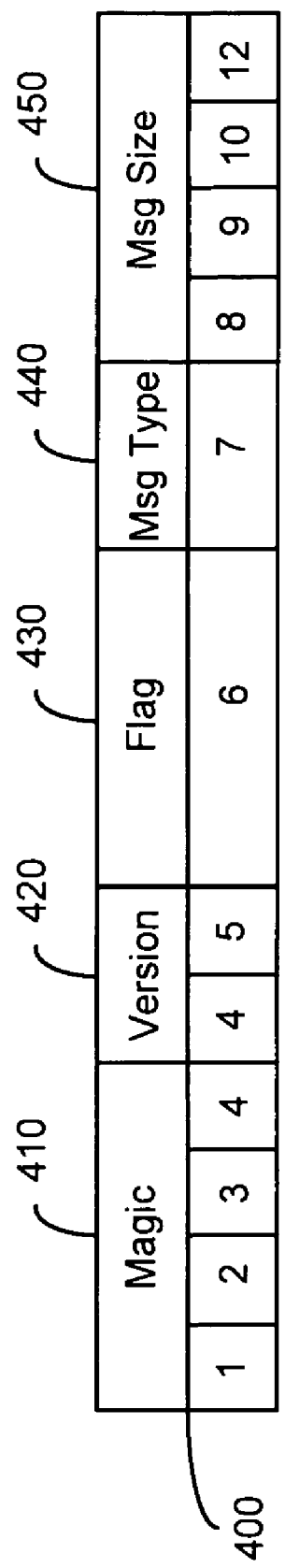
FIG. 4 shows selected portions of one example of an IIOP protocol header.

An example of a standards-based protocol used in an embodiment of the invention is IIOP. FIG. 4 shows selected portions of one example of an IIOP protocol header 400. IIOP protocol header 400 includes protocol magic 410, Global Inter-ORB Protocol (GIOP) version 420, flag 430, message type 440, and message size 450. Protocol magic 410 is a four-byte portion of the message header whose value is the four upper-case characters "GIOP." GIOP version 420 is a two-byte element of the message header that specifies the version number of the GIOP protocol being used in the message. Flag 430 is an eight-bit octet to provide various flags for the message. Message type 440 specifies a message type for the message (e.g., request, reply, cancel request, locate request, locate reply, close connection, message error, fragment, etc.). Message size 450 specifies the size of the message that follows the message header.

Figure 5:
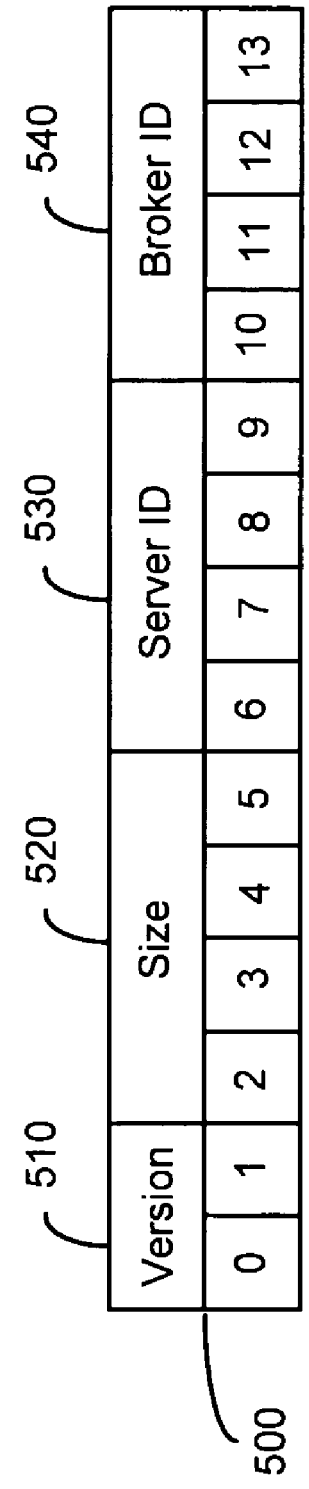
FIG. 5 shows selected portions of one example of a P4 protocol header.

An example of a proprietary protocol used in an embodiment of the invention is P4. FIG. 5 shows selected portions of one example of a P4 protocol header 500. P4 protocol header 500 includes version 510, size 520, server identifier 530, and broker identifier 540. Version 510 is a two-byte element of the message header species the version of P4 protocol for the message. Size 520 is a four-byte element that specifies the size of the message. Service identifier 530 is a four-byte element that specifies an identifier to uniquely identify a server, for example, within a cluster of servers. Broker identifier 540 is a four-byte field that can be used to identify a cluster in which the server resides.

Referring again to FIG. 3, in an embodiment, the communication between connection manager 310 and the internal communication partners is session based. In such an embodiment, session communication data 350 is prepended to messages between connection manager 310 and the internal communication partners. Session logic associated with the internal communication partners ($346_1$-$346_M$) and connection manager 310 (not shown) processes session communication data 350.

Figure 6:
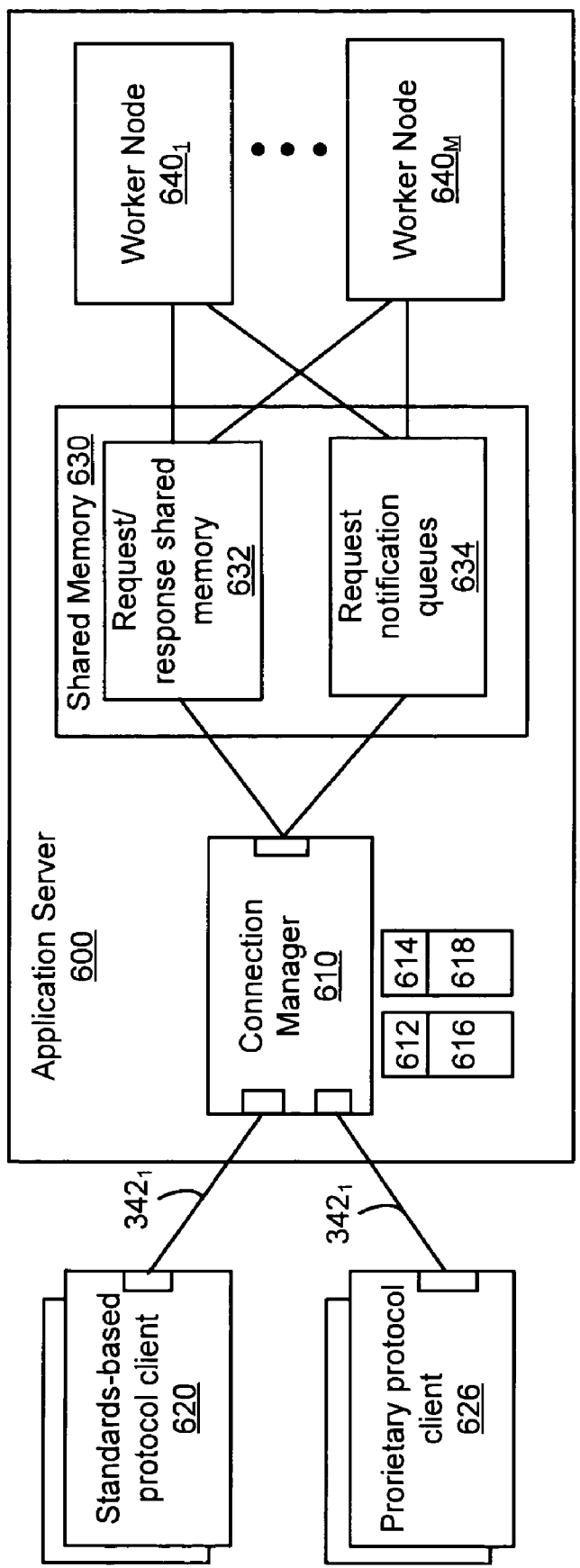
FIG. 6 is a block diagram illustrating selected aspects of an embodiment in which internal communication partners use a shared memory to communicate with a connection manager.

FIG. 6 is a block diagram illustrating selected aspects of an embodiment in which internal communication partners use a shared memory to communicate with a connection manager. Application server 600 includes connection manager 610 which is capable of exchanging messages with standards-based protocol client 620 and proprietary protocol client 626. Connection manager 610 uses pluggable protocol handlers to process these messages in substantially the same way as discussed above with reference to FIG. 3. Unlike the system shown in FIG. 3, however, connection manager 610 exchanges messages with worker nodes $640_1$-$640_M$ through shared memory 630.

Shared memory 630 is a memory resource that each of worker nodes $640_1$ through $640_M$ can access to exchange messages and other information with connection manager 610. In the illustrated embodiment, shared memory 630 includes request/response shared memory 632 and request notification queues 634. Connection manager 610 writes request data into (and reads response data from) request/response shared memory 632. Any of worker nodes $640_1$-$640_M$ can retrieve the request data from request/response shared memory 632. Likewise, any of worker nodes $640_1$-$640_M$ can write a response into request/response shared memory 632 that can later be retrieved by connection manager 610.

Connection manager 610 uses request notification queues 634 to notify worker nodes $640_1$-$640_M$ that request data is available in request/response shared memory 632. In an embodiment, each of worker nodes $640_1$-$640_M$ has a separate request notification queue within request notification queues 634. In such an embodiment, connection manager 610 may store a handle in the appropriate queue of a worker node to notify the worker node that request data is available. The worker node can then retrieve the handle and use it to access request/response shared memory 632 and obtain the request data.

Figure 7:
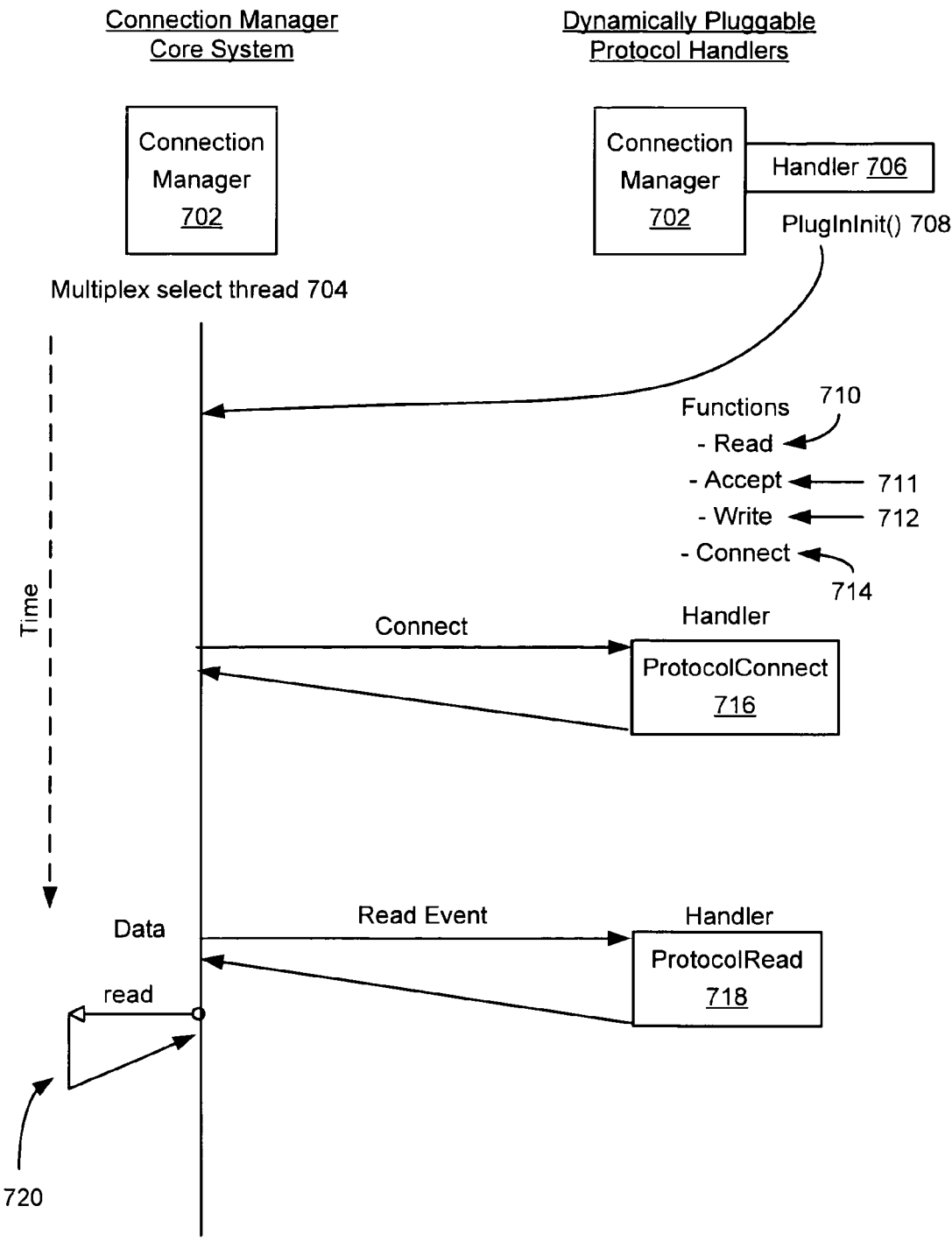
FIG. 7 is a conceptual diagram illustrating a pluggable protocol handler implemented according to an embodiment of the invention.

FIG. 7 is a conceptual diagram illustrating a pluggable protocol handler implemented according to an embodiment of the invention. In an embodiment, connection manager 702 uses multiplex select thread 704 to monitor a number of network connection endpoints (e.g., sockets such as Transmission Control Protocol/Internet Protocol sockets). A "multiplex select thread" refers to a function that determines the status of one or more sockets (and waits if necessary) to perform input/output. For each socket, a caller can request information on, for example, read or write status.

Over time, connection manager 702 calls pluggable protocol handler 706 to process messages implemented according to either a standards-based protocol (e.g., IIOP) or a proprietary protocol (e.g., P4). In an embodiment, pluggable protocol handler 706 (or, for ease of reference, handler 706) handles a connection oriented protocol on a multiplexed connection (e.g., multiplexed connections 322, 332, and 348, shown in FIG. 3). Handler 706 registers a number of callback functions at connection manager 702 to respond to various events including: new client connection available, connection to communication partner established, data available, write to connection possible, and connection closed. The registered function is called if the associated event is occurring on a connection. Table 1 illustrates selected functions for handler 706 according to an embodiment of the invention.

TABLE 1

| Function | Event |
| --- | --- |
| Connect | Connect to a communication partner on a multiplexed connection. |
| Accept | Accept incoming connection from external or internal communication partner (e.g. 620, 626). |
| Read | Read from a multiplexed connection. In an embodiment network fragmentation is supported. That is, for each read operation, either a complete message or a portion of the message can be read. |
| Write | Write to a multiplexed connection. For each write operation, either a complete message or a portion of the message can be written. |
| AllocBuf | Allocate a buffer for writing on a multiplexed connection. |
| Close | Close a multiplexed connection. |
| GetInfo | Retrieve information about the connection. |
| FindConn | Determine whether there is already a connection on a specified network connection endpoint (e.g., as specified by a protocol, hostname, and port number). |

In an embodiment, PlugInInit function 708 is called after handler 706 is loaded into connection manager 702. PlugInInit function 708 provides handler specific initialization for handler 706. Initialization may include providing version information of connection manager 702, supported protocol information, hostname, port number, and the like.

Handler 706 registers one or more input/output functions with multiplex select thread 704. Multiplex select thread 704 calls these functions if an associated event occurs on a network connection. In one embodiment, the functions registered for handler 706 include read 710, accept 711, write 712, and connect 714.

In an embodiment, read 710 allows handler 706 to read from a multiplexed connection. Reading from the multiplexed connection may include reading an entire message or only reading a fragment of the message. If only a fragment of the message is read, then read 710 may be repeatedly called until the entire message has been read. Pseudo-code listing 1 illustrates read data processing, according to an embodiment of the invention. Pseudo-code listing 1 is directed to read data processing for data implemented according to the P4 protocol (implementing a state machine). It is to be appreciated that similar read data processing may be used for other protocols (either standards-based protocols or proprietary protocols).

LISTING 1

```
state == read request:
        Read( ) -> buffer, buffer length
        if buffer length >= P4 header length (fixed size)
                process P4 header
                state = P4 body
        else
                store buffer locally
                store buffer length locally
```

-continued

LISTING 1

```
            state = header fragmented
        end
state == header fragmented:
        Read( ) -> buffer, buffer length
        if length + stored length >= P4 header length
            state = P4 body
        else
            append buffer to stored buffer
            add buffer length to stored buffer length
        end
state == P4 body:
        Read( ) -> buffer, buffer length
        if buffer length >= P4 message length
            message is complete
            forward message to server node
            state = read request
```

In an embodiment, write 712 allows handler 706 to write data to a multiplexed connection. Writing to the multiplexed connection may include writing an entire message or only writing a fragment of the message. If only a fragment of the message is written, then write 712 may be repeatedly called until the entire message has been written.

Connect 714 allows handler 706 to connect to a communication partner on a multiplexed connection. The communication partner may be either an internal communication partner (e.g., worker nodes $340_1$-$340_M$, shown in FIG. 3) or an external communication partner (e.g., clients 320 and 330, shown in FIG. 3). Accept 711 allows the connection manager 702 to accept new incoming connections from an external or internal client. Multiplex select thread 704 can either accept or reject the request to connect to a communication partner based, at least in part, on whether sufficient resources exist to form the connection.

Reference number 716 illustrates handler 706 requesting a connection with connect function 714. Similarly, reference number 718 illustrates handler 706 reading data from a multiplexed connection. Other handlers for other protocols (not shown) can access multiplex select thread 704 to perform similar input/output functions as shown by reference number 720.

Figure 8:
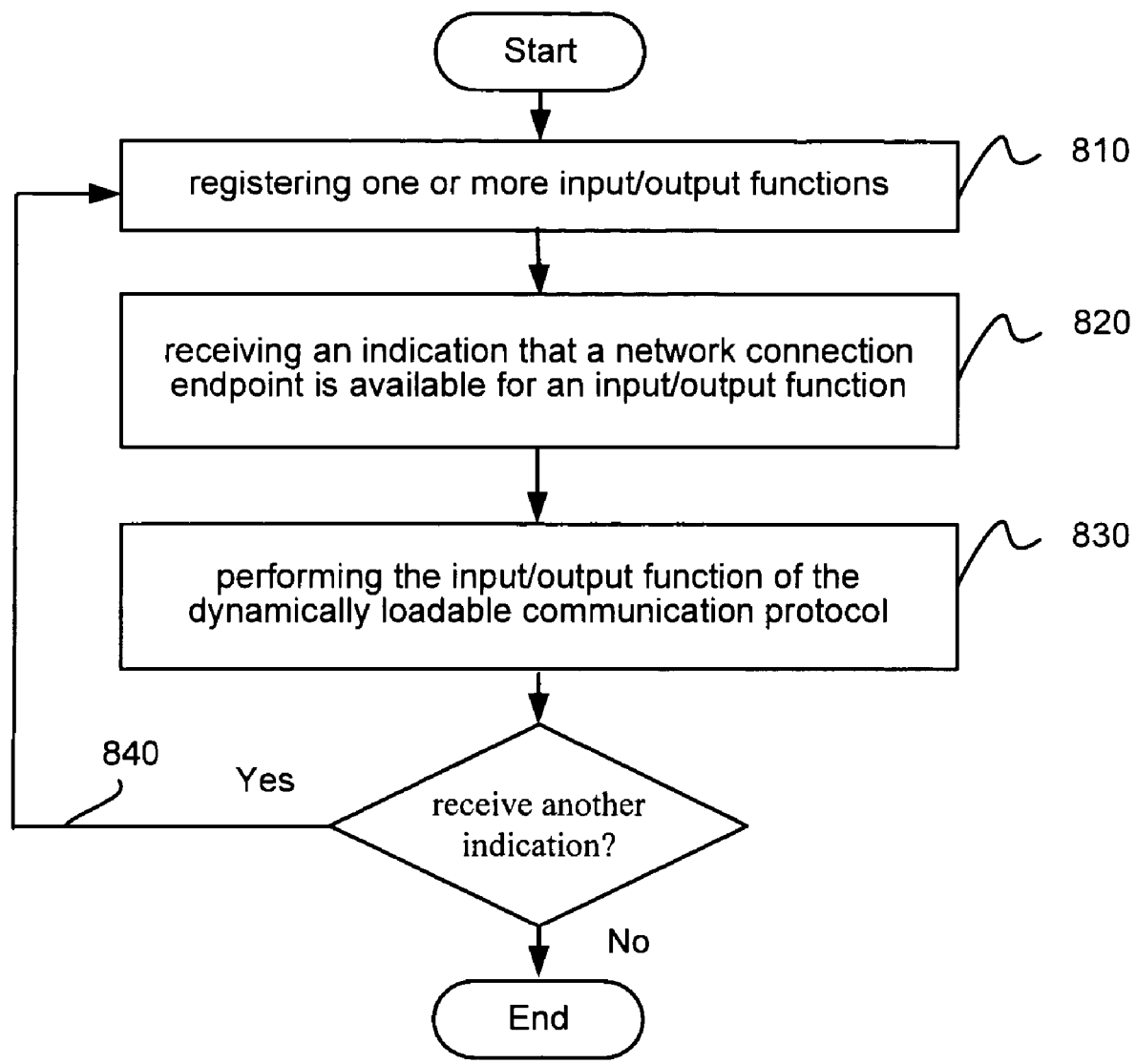
FIG. 8 is a flow diagram illustrating selected aspects of a pluggable protocol handler according to an embodiment of the invention.

Turning now to FIG. 8, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating selected aspects of a pluggable protocol handler according an embodiment of the invention. Referring to process block 810, one or more input/output functions of a dynamically loadable communication protocol handler (handler 706, shown in FIG. 7) are registered with a connection manager (e.g., connection manager 702, shown in FIG. 7). The input/output functions allow the connection manager to process messages between communication partners by calling the dynamically loadable communication protocol handler. In one embodiment, the input/output functions include a read function (e.g., read 710, shown in FIG. 7), a write function (e.g., write 712, shown in FIG. 7), an accept function (e.g. 711), and a connect function (e.g., connect 714, shown in FIG. 7). In an alternative embodiment, more functions, fewer functions, and/or different functions may be used.

Referring to process block 820, the dynamically loadable protocol handler receives an indication that a network connection endpoint is available for an input/output function. The received indication may be, for example, a return from a select thread (e.g., multiplex select thread 704, shown in FIG. 7) indicating that a network connection is ready for an input/output function, or may be an indication on the connection oriented shared memory indicating that data is ready for processing.

Referring to process block 830, an input/output function of the dynamically loadable protocol handler is performed. Examples of input/output functions include read functions, write functions, and connect functions. In an embodiment, the fragmentation of network messages is supported. In such an embodiment, read/write functions may read/write either an entire message or only a portion of the message (e.g., a message fragment). The read/write function may be repeatedly called until the entire message is read from the connection or written to the connection. The process can be repeated as shown by 840.

Additional Comments

The architectures and methodologies discussed above may be implemented with various types of computing systems such as an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, compact disks-read only memory (CD-ROMs), digital versatile/video disks (DVD ROMs), erasable programmable read-only memory (EPROMs), electrically erasable programmable read-only memory (EEPROMs), magnetic or optical cards or other type of computer-readable media suitable for storing electronic instructions.

Figure 9:
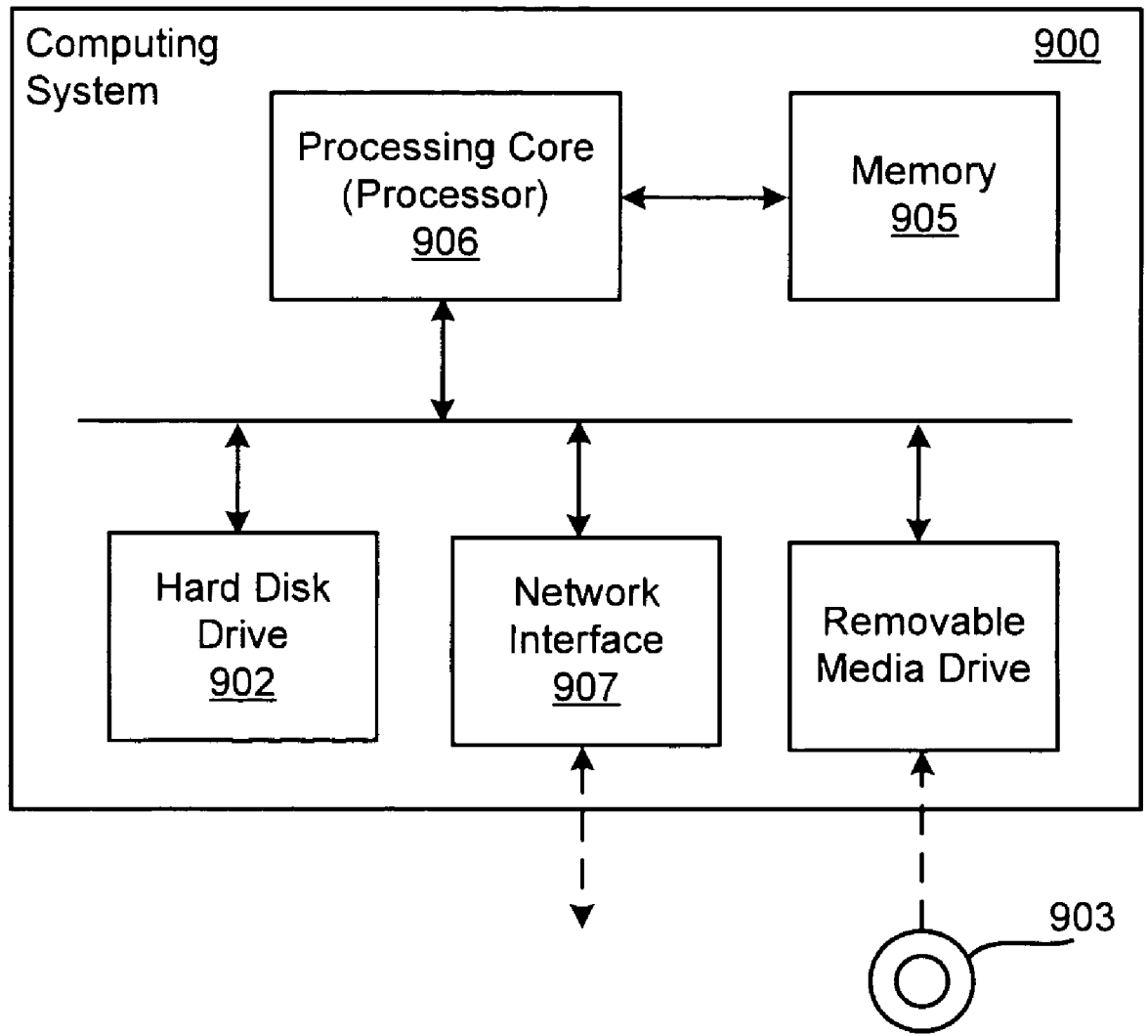
FIG. 9 shows a depiction of a computing system.

FIG. 9 is a block diagram of a computing system 900 that can execute program code stored by an article of manufacture. It is important to recognize that the computing system block diagram of FIG. 9 is just one of various computing system architectures. The applicable article of manufacture may include one or more fixed components (such as a hard disk drive 902 or memory 905) and/or various movable components such as a CD ROM 903, a compact disc, a magnetic tape, etc. In order to execute the program code, typically instructions of the program code are loaded into the Random Access Memory (RAM) 905; and, the processing core 906 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 906.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An application server comprising:
   a protocol independent connection manager, the connection manager to receive messages in accordance with a plurality of protocols including a first protocol and a second protocol, the connection manager to receive a message from a first client on a first network connection of the connection manager, the connection manager utilizing the first protocol or the second protocol for reception of the received message;
   a plurality of dynamically loadable communication protocol handlers to handle messages, the plurality of dynamically loadable communication protocol handlers including a first dynamically loadable communication protocol handler to handle messages received via the first protocol and a second dynamically loadable communication protocol handler to handle messages received via the second protocol, wherein in response to receiving the message the connection manager is to choose the first dynamically loadable communication protocol handler or the second dynamically loadable communication protocol handler based one of the plurality of protocols utilized for reception of the received message;
   a computer memory, the computer memory including a shared memory region that can be accessed by each of a first plurality of worker nodes associated with the first protocol or a second plurality of worker nodes associated with the second protocol for a transfer of received messages; and
   a plurality of notification queues each to notify one of the first and second plurality of worker nodes that data is available in the shared memory region,
   wherein the chosen dynamically loadable communication protocol handler is to select a first worker node of the plurality of worker nodes associated with one of the plurality of protocols of the chosen dynamically loadable communication protocol handler to handle the received message and is to forward the received message to the first worker node via the shared memory, the first worker node to access the received message in the shared memory,
   wherein the chosen dynamically loadable communication protocol handler is loaded at runtime.

2. The application server of claim 1, wherein the first network connection is a multiplexed network connection, the multiplexed network connection multiplexing messages for a plurality of clients, and
   wherein the connection manager is to monitor a status of a number of network connection endpoints.

3. The application server of claim 2, wherein the chosen dynamically loadable communication protocol handler implements, at least in part, a standards-based communication protocol.

4. The application server of claim 3, wherein the standards-based communication protocol is the Internet Inter-Object Request Broker Protocol.

5. The application server of claim 2, wherein the chosen dynamically loadable communication protocol handler implements, at least in part, a proprietary communication protocol.

6. The application server of claim 5, wherein the proprietary communication protocol is the proprietary P4 protocol of SAP AG.

7. The application server of claim 2, wherein the connection manager is to receive a response message from the first worker node, and wherein the chosen dynamically loadable communication protocol handler is to select the first client as an appropriate client of the plurality of clients to receive the response.

8. The application server of claim 7, wherein the chosen dynamically loadable communication protocol handler is to forward the response message to the first client, wherein the dynamically loadable communication protocol handler is an application programming interface to process and route messages.

9. The application server of claim 2, wherein the multiplexed network connection is implemented with a connection oriented shared memory, wherein the connection oriented shared memory includes:
   a first shared memory region to store request and response data transfers for the first protocol;
   a second shared memory region to store session objects including data fields and procedures for the request and response data transfers; and
   a third shared memory region to store session state information relating to a flow management of the request and response data transfers.

10. The application server of claim 1, wherein the plurality of notification queues enables the application server to transfer work among the first and second plurality of worker nodes for fault tolerance and load balancing.

11. The application server of claim 10, wherein the application server to use the plurality of notification queues to implement fail protection mechanism by transferring a session from a first worker node to a second worker node on failure of the first worker node.

12. The application server of claim 1, wherein at least one of the plurality of dynamically loadable communication protocol handlers is to register an input/output function with a multiplex select thread for a multiplexed connection to call the input/output function on occurrence of an event.

13. The method of claim 12, wherein the function implements a multiplex select thread, and wherein the at least one of the number of network connection endpoints is a socket to a worker node of the first and second plurality of worker nodes.

14. The application server of claim of 13, wherein the multiplex select thread determines to accept a connection request when resources are available for a connection.

15. The application server of claim 14, wherein at least two of the plurality of dynamically loadable communication protocol handlers have access to the multiplex select thread.

16. The application server of claim 1, wherein each of the plurality of dynamically loadable communication protocol handlers is registered with the protocol independent connection manager.

17. A method comprising:
receiving a message at a connection manager of an application server from a first client, the connection manager being independent of message protocols, the message being received in accordance with a first message protocol;
dynamically loading a first dynamically loadable communication protocol handler in the connection manager, the first communication protocol handler and a second communication protocol handler being included in a plurality of communication protocol handlers, the first communication protocol handler being compatible with the first message protocol and the second communication protocol handler being compatible with a second message protocol;
receiving at the first communication protocol handler an indication that a network connection endpoint is available for an input/output function for the received message;
performing the input/output function of the first communication protocol handler responsive, at least in part, to receiving the indication that the network connection endpoint is available, wherein performing the input/output function includes selecting a first worker node of a first plurality of worker nodes associated with the first message protocol to handle the received message and forwarding the received message to the first worker node via a shared memory, the shared memory being accessible to the first plurality of worker nodes and to a second plurality of worker nodes associated with the second message protocol; and
generating notifications at a plurality of notification queues, wherein each notification is to notify one of the first and second plurality of worker nodes that data is available in a shared memory region
wherein dynamically loading a first dynamically loadable communication protocol handler in the connection manager occurs at runtime.

18. The method of claim 17, further comprising:
registering one or more input/output functions of the first communication protocol handler with the connection manager, the one or more input/output functions to allow the connection manager to call the first communication protocol handler.

19. The method of claim 17, wherein the network connection endpoint is a multiplexed network connection endpoint, and wherein the method further comprises monitoring a status of a number of network connection endpoints.

20. The method of claim 17, wherein receiving at the first communication protocol handler the indication that the network connection endpoint is available for an input/output function comprises:
receiving a handle from a select thread indicating that the network connection endpoint is available for an input/output function, and
monitoring a status of a number of network connection endpoints using a multiplex of select threads.

21. The method of claim 20, wherein receiving the handle includes receiving a handle for a read function and further comprising:
reading at least part of a message from the network connection endpoint.

22. The method of claim 21, wherein reading at least part of the message from the network connection comprises:
reading at least a part of a message header associated with the message; and
determining the first worker node as a destination for the message based, at least in part, on the message header.

23. The method of claim 22, wherein the message header is based, at least in part, on one of:
a standards-based communication protocol; and
a proprietary communication protocol.

24. The method of claim 23, wherein the standards-based communication protocol is the Internet Inter-Object Request Broker Protocol (IIOP).

25. The method of claim 20, further comprising:
receiving a request from a worker node of the first and second plurality of worker nodes; and
accessing one of the plurality of notification queues associated with the worker node.

26. The method of claim 20, wherein monitoring the status further comprises accessing a function to determine the status of at least one of the number of network connection endpoints.

27. The method of claim 17, further comprising:
receiving a response message from the first worker node;
performing one or more input/output functions of the first communication protocol handler, the functions including selecting the first client as a destination for the response message and forwarding the response message to the first client.

28. An article of manufacturer comprising a non-transitory computer readable medium providing instructions that, when executed by a processor, cause the processor to:
receive a message at a connection manager of an application server from a first client, the connection manager being independent of message protocols, the message being received in accordance with a first message protocol;
dynamically load a first dynamically loadable communication protocol handler in the connection manager, the first communication protocol handler and a second communication protocol handler being included in a plurality of communication protocol handlers, the first communication protocol handler being compatible with the first message protocol and the second communication protocol handler being compatible with a second message protocol;
receive at the first communication protocol handler an indication that a network connection endpoint is available for an input/output function for the received message;
perform the input/output function of the first communication protocol handler responsive, at least in part, to receiving the indication that the network connection endpoint is available, wherein performing the input/output function includes selecting a first worker node of a first plurality of worker nodes associated with the first message protocol to handle the received message and forwarding the received message to the first worker node via a shared memory, the shared memory being accessible to the first plurality of worker nodes and to a second plurality of worker nodes associated with the second message protocol; and generate notifications at a plurality of notification queues, wherein each notification is to notify one of the first and second plurality of worker nodes that data is available in a shared memory region wherein dynamically loading a first dynamically loadable communication protocol handler in the connection manager occurs at runtime.

29. The article of manufacture of claim 28, wherein the computer readable medium provides further instructions that, when executed by the processor, cause the processor to:

register one or more input/output functions of the first communication protocol handler with the connection manager, the one or more input/output functions to allow the connection manager to call the first communication protocol handler.

30. The article of manufacture of claim 28, wherein the instructions that, when executed by the processor, cause the processor to receive at the first communication protocol handler the indication that the network connection endpoint is available for an input/output function cause the processor to:

receive a handle from a select thread indicating that the network connection endpoint is available for an input/output function.

31. The article of manufacture of claim 28, wherein the computer readable medium provides further instructions that, when executed by the processor, cause the processor to:

receive a response message from the first worker node;

perform one or more input/output functions of the first communication protocol handler, the functions including selecting the first client as a destination for the response message and forwarding the response message to the first client.

\* \* \* \* \*